(12) United States Patent
Yokota et al.

(10) Patent No.: US 11,703,731 B2
(45) Date of Patent: Jul. 18, 2023

(54) ELECTRO-OPTICAL DEVICE AND ELECTRONIC APPARATUS

(71) Applicant: SEIKO EPSON CORPORATION, Tokyo (JP)

(72) Inventors: Tomoki Yokota, Suwa (JP); Kikuya Morita, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/692,206

(22) Filed: Mar. 11, 2022

(65) Prior Publication Data

US 2022/0291557 A1    Sep. 15, 2022

(30) Foreign Application Priority Data

Mar. 12, 2021  (JP) ................. 2021-039995

(51) Int. Cl.
*G02F 1/1362* (2006.01)
*G02F 1/1368* (2006.01)

(52) U.S. Cl.
CPC ...... *G02F 1/136213* (2013.01); *G02F 1/1368* (2013.01); *G02F 1/136286* (2013.01)

(58) Field of Classification Search
CPC ............. G02F 1/136213; G02F 1/1368; G02F 1/133302
See application file for complete search history.

(56) References Cited

U.S. PATENT DOCUMENTS

| 6,091,078 A * | 7/2000 | Codama ................. H05B 33/02 313/506 |
| 2007/0165147 A1* | 7/2007 | Kamijima ........... H01L 27/1218 257/E27.113 |
| 2018/0203314 A1 | 7/2018 | Sugimoto |

FOREIGN PATENT DOCUMENTS

| JP | H05265040 | 10/1993 |
| JP | 2003152086 | 5/2003 |
| JP | 2004271903 | 9/2004 |
| JP | 2004325627 | 11/2004 |
| JP | 2004334064 | 11/2004 |
| JP | 2004363300 | 12/2004 |
| JP | 2012198386 | 10/2012 |
| JP | 2018116077 | 7/2018 |

* cited by examiner

*Primary Examiner* — James A Dudek
(74) *Attorney, Agent, or Firm* — JCIPRNET

(57) ABSTRACT

A first substrate of an electro-optical device includes: a substrate body provided with a groove; an insulating film layered on the substrate body in a region including the groove; and a layered film layered on the insulating film. The layered film is provided along a side surface and a bottom surface of the groove with the insulating film disposed therebetween.

9 Claims, 20 Drawing Sheets

US 11,703,731 B2

ELECTRO-OPTICAL DEVICE AND ELECTRONIC APPARATUS

The present application is based on, and claims priority from JP Application Serial Number 2021-039995, filed Mar. 12, 2021, the disclosure of which is hereby incorporated by reference herein in its entirety.

BACKGROUND

1. Technical Field

The present disclosure relates to an electro-optical device and an electronic apparatus.

2. Related Art

In electro-optical devices such as liquid crystal devices, a structure is widely employed in which a capacitance element obtained by sequentially layering a first conductive film, a dielectric film, and a second conductive film is provided between the pixel electrode and the substrate body, and in which the voltage of the pixel electrode is held by the capacitance element. Since the first conductive film or the second conductive film generally has low light transmissivity, the capacitance element is generally provided in a region overlapping a scanning line or a data line in plan view. On the other hand, it is desirable that the capacitance element has a large capacitance. Thus, a structure has been proposed in which a groove is provided in a region overlapping the capacitance element in plan view, and in which the capacitance of the capacitance element is increased utilizing the side surfaces of the groove (see JP-A-2004-363300).

In the configuration described in JP-A-2004-363300, the clearance in the width direction between the opening edges of the groove and the ends of the capacitance element may be reduced to near the processing limit so that the capacitance element does not greatly overhang the scanning line or data line. However, in a case in which the clearance in the width direction between the opening edges of the groove and the ends of the capacitance element is reduced, when the width dimensions or positions of the groove and the capacitance element are shifted, an end of the capacitance element will fall down on the inner side of the groove, which may cause variation in capacitance among the capacitance elements or a short circuit between the first conductive film and the second conductive film. Therefore, when forming an element such as a capacitance element so as to overlap a groove, the element or the like cannot be appropriately provided in accordance with the opening edges of the groove and the ends of the element.

SUMMARY

In order to solve the above problems, an electro-optical device according to an aspect of the present disclosure includes: a substrate body provided with a groove, an insulating film layered on the substrate body in a region including the groove, and a layered film layered on the insulating film, wherein the layered film is provided along a side surface and a bottom surface of the groove with the insulating film disposed therebetween.

In the present disclosure, a method for manufacturing an electro-optical device including a capacitance element between a substrate main body and a pixel electrode in a region including a groove depressed toward an opposite side from the pixel electrode includes: a first step of forming the groove, a second step of forming an insulating film in a region including the groove, a third step of forming a first conductive film overlapping a sidewall and a bottom wall of the groove with the insulating film disposed therebetween, a fourth step of forming a dielectric film overlapping the sidewall and the bottom wall with the first conductive film and the insulating film disposed therebetween, and a fifth step of forming a second conductive film overlapping the sidewall and the bottom wall with the dielectric film, the first conductive film, and the insulating film disposed therebetween.

The electro-optical device according to the present disclosure is used for various electronic apparatuses.

DESCRIPTION OF EXEMPLARY EMBODIMENTS

Figure 1:
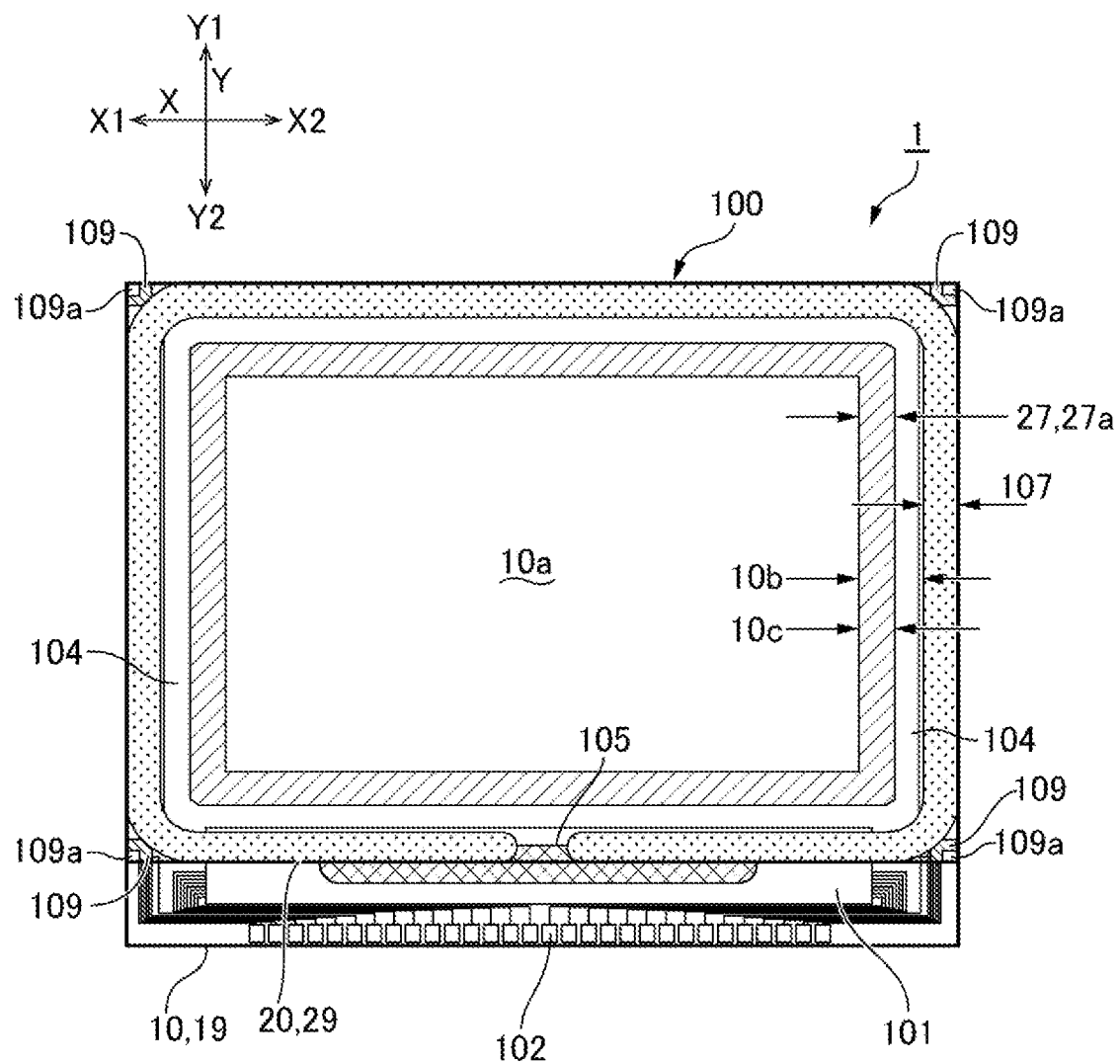
FIG. 1 is a plan view illustrating an aspect of an electro-optical device according to Embodiment 1 of the present disclosure.

Embodiments of the present disclosure will be described below with reference to the drawings. Note that, in each of the figures referred to in the following description, to illustrate each layer and each member at a recognizable size in the drawings, each layer and each member are illustrated at a different scale. Furthermore, in the following description, of two in-plane directions intersecting each other of a first substrate 10, a "first direction" is the X-axis direction, while a "second direction" is the Y-axis direction. Furthermore, in describing a layer formed at the first substrate 10, an upper layer side or a front surface side represents an opposite side from a side on which a substrate is located (a side on which a counter substrate is located), while a lower layer side represents the side on which the substrate is located.

Embodiment 1

Configuration of Electro-Optical Device

Figure 2:
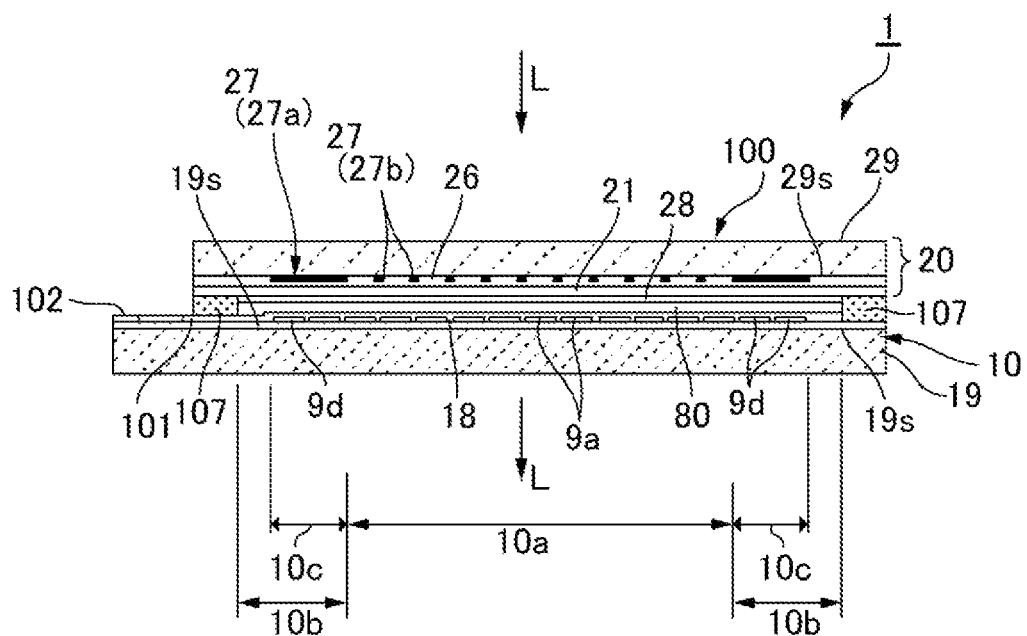
FIG. 2 is a cross-sectional view of the electro-optical device illustrated in FIG. 1.

FIG. 1 is a plan view illustrating an aspect of an electro-optical device 1 according to Embodiment 1 of the present disclosure. FIG. 2 is a cross-sectional view of the electro-optical device 1 illustrated in FIG. 1. As illustrated in FIGS. 1 and 2, in the electro-optical device 1, the first substrate 10 including a substrate body 19 and a second substrate 20 including a substrate body 29 are bonded together with a predetermined gap therebetween by a seal material 107, and the first substrate 10 faces the second substrate 20. The seal material 107 is provided in a frame-like shape along the outer edge of the second substrate 20. An electro-optical layer 80 such as a liquid crystal layer is disposed in a region surrounded by the seal material 107 between the first substrate 10 and the second substrate 20. The electro-optical device 1 of the present embodiment is a liquid crystal device including a liquid crystal panel 100. The seal material 107 is a photocurable adhesive, or a photocurable and thermosetting adhesive. A gap material such as glass fiber or glass beads for setting a distance between both substrates to a predetermined value is compounded into the seal material 107. The first substrate 10 and the second substrate 20 are both a quadrangle. Substantially at the center of the electro-optical device 1, a display region 10a is provided as a quadrangular region. In correspondence to such a shape, the seal material 107 is also provided substantially in a quadrangle, and a peripheral region 10b having a rectangular frame shape is provided between an inner peripheral edge of the seal material 107 and an outer peripheral edge of the display region 10a.

The substrate body 19 includes a light-transmitting substrate such as a quartz substrate and a glass substrate. On a first surface 19s side of the substrate body 19, on an outer side of the display region 10a, a data line driving circuit 101 and a plurality of terminals 102 are formed along one side of the substrate body 19. Along other sides adjacent to this one side, scanning line driving circuits 104 are formed. A flexible wiring substrate (not illustrated) is coupled to the terminals 102. Various potentials and various signals are input to the first substrate 10 via the flexible wiring substrate.

On the first surface 19s of the substrate body 19, in the display region 10a, a plurality of light-transmitting pixel electrodes 9a formed of an indium tin oxide (ITO) film or the like, and transistors (not illustrated in FIGS. 1 and 2) electrically coupled to each of the plurality of pixel electrodes 9a are formed in a matrix pattern. A first alignment film 18 is formed at the second substrate 20 side of the pixel electrodes 9a, and the pixel electrodes 9a are covered with the first alignment film 18. Accordingly, from the substrate body 19 to the first alignment film 18 corresponds to the first substrate 10.

The substrate body 29 includes a light-transmitting substrate such as a quartz substrate and a glass substrate. On a first surface 29s side of the substrate body 29, a light-transmitting common electrode 21 formed of an ITO film or the like is formed. The common electrode 21 is formed substantially over the entire surface of the second substrate 20. A second alignment film 28 is formed on the first substrate 10 side of the common electrode 21, and the common electrode 21 is covered with the second alignment film 28. Accordingly, from the substrate body 29 to the second alignment film 28 corresponds to the second substrate 20. In the second substrate 20, a light-shielding layer 27 having light-shielding properties and formed of resin, a metal, or a metal compound is formed between the substrate body 29 and the common electrode 21, and a light-transmitting protective layer 26 is formed between the light-shielding layer 27 and the common electrode 21. The light-shielding layer 27 is formed, for example, as a partition 27a having a frame shape and extending along the outer peripheral edge of the display region 10a. In some cases, the light-shielding layer 27 is formed as a black matrix 27b in a region overlapping a region sandwiched between adjacent pixel electrodes 9a in plan view. Of the peripheral region 10b of the substrate body 19, in a region 10c overlapping the partition 27a in plan view, dummy pixel electrodes 9d concurrently formed with the pixel electrodes 9a are formed.

The first alignment film 18 and the second alignment film 28 are inorganic alignment films formed of a diagonally vapor-deposited film of $SiO_x$ (x<2), $SiO_2$, $TiO_2$, MgO, $Al_2O_3$, or the like, and align liquid crystal molecules having negative dielectric anisotropy used in the electro-optical layer 80 in an inclined manner. Consequently, the liquid crystal molecules form a predetermined angle with the substrate body 19 and the substrate body 29. In this way, the electro-optical device 1 is constituted as a liquid crystal device of a vertical alignment (VA) mode.

In the first substrate 10, in a region overlapping a corner portion of the substrate body 29 on an outer side of the seal material 107, an inter-substrate conduction electrode 109 for establishing electrical conduction between the first substrate 10 and the second substrate 20 is formed. In the inter-substrate conduction electrode 109, an inter-substrate conduction material 109a containing conductive particles is disposed. The common electrode 21 of the second substrate 20 is electrically coupled to the first substrate 10 side via the inter-substrate conduction material 109a and the inter-substrate conduction electrode 109. Consequently, a common potential is applied to the common electrode 21 from the first substrate 10 side.

In the electro-optical device 1 of the present embodiment, the pixel electrodes 9a and the common electrode 21 are formed of an ITO film, and the electro-optical device 1 is constituted as a transmissive liquid crystal device. In such an electro-optical device 1, of the first substrate 10 and the second substrate 20, light incident on the electro-optical layer 80 from one of the substrates is modulated, while being transmitted through and emitted from the other of the substrates, to display an image. In the present embodiment, as indicated by an arrow L, light incident from the second substrate 20 is modulated pixel by pixel by the electro-optical layer 80, while being transmitted through and emitted from the first substrate 10, to display an image.

Electrical Configuration of Electro-Optical Device 1

Figure 3:
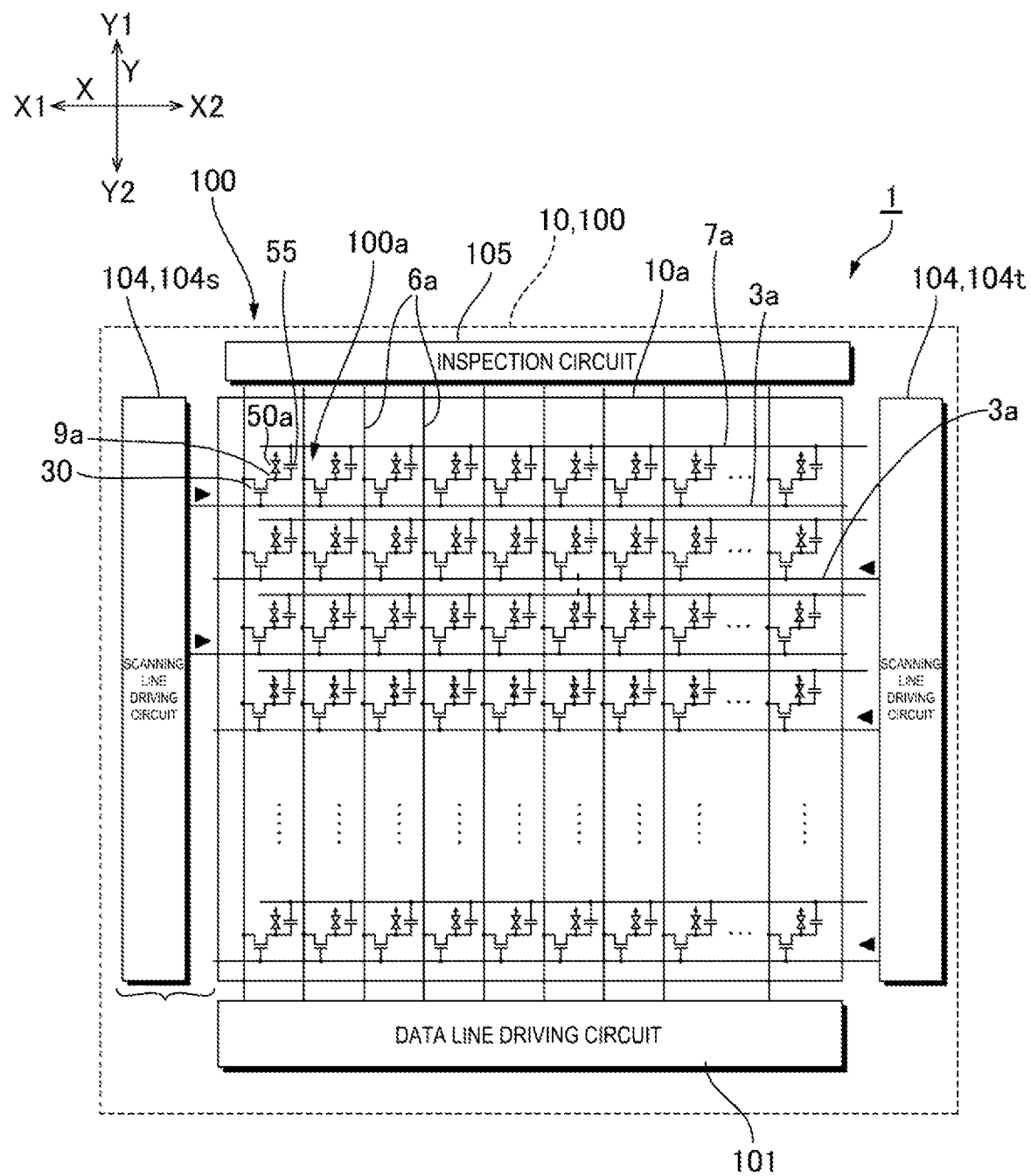
FIG. 3 is a block diagram illustrating an electrical configuration of the electro-optical device illustrated in FIG. 1.

FIG. 3 is a block diagram illustrating an electrical configuration of the electro-optical device 1 illustrated in FIG.

1. In FIG. 3, the electro-optical device 1 includes a liquid crystal panel 100 of a VA mode. The liquid crystal panel 100 includes, in a central region thereof, the display region 10a in which a plurality of pixels 100a are arranged in a matrix pattern. In the liquid crystal panel 100, in the first substrate 10 described above with reference to FIGS. 1, 2, and the like, a plurality of scanning lines 3a extending in the X-axis direction and a plurality of data lines 6a extending in the Y-axis direction are formed on the inner side of the display region 10a. The plurality of pixels 100a are formed corresponding to the respective intersections between the plurality of scanning lines 3a and the plurality of data lines 6a. The plurality of scanning lines 3a are electrically coupled to the scanning line driving circuits 104, while the plurality of data lines 6a are coupled to the data line driving circuit 101. Furthermore, an inspection circuit 105 is electrically coupled to the plurality of data lines 6a on the opposite side in the Y-axis direction from the data line driving circuit 101.

In each of the plurality of pixels 100a, a transistor 30 for pixel switching including a field effect transistor or the like, and the pixel electrode 9a electrically coupled to the transistor 30 are formed. The data line 6a is electrically coupled to one source/drain region of the transistor 30. The scanning line 3a is electrically coupled to the gate of the transistor 30. The pixel electrode 9a is electrically coupled to the other source/drain region of the transistor 30. An image signal is supplied to the data line 6a, while a scanning signal is supplied to the scanning line 3a. In the present embodiment, the scanning line driving circuits 104 are formed as a scanning line driving circuit 104s on a first side X1 in the X-axis direction of the display region 10a, and a scanning line driving circuit 104t on a second side X2 in the X-axis direction of the display region 10a. The scanning line driving circuit 104s on the first side X1 in the X-axis direction drives odd-numbered scanning lines 3a, while the scanning line driving circuit 104t on the second side X2 in the X-axis direction drives even-numbered scanning lines 3a.

In each of the pixels 100a, the pixel electrode 9a faces the common electrode 21 described above with reference to FIGS. 1 and 2 with the electro-optical layer 80 disposed therebetween, and constitutes a liquid crystal capacitor 50a. In each of the pixels 100a, a capacitance element 55 is added in parallel with the liquid crystal capacitor 50a to prevent fluctuation of the image signal held by the liquid crystal capacitor 50a. In the present embodiment, to constitute the capacitance elements 55, capacitance lines 7a extending across the plurality of pixels 100a are formed in the substrate body 19, and the common potential is supplied to the capacitance lines 7a. In FIG. 3, one capacitance line 7a is illustrated extending in the X-axis direction. However, in some cases, a configuration may be employed in which the capacitance lines 7a extend in the Y-axis direction, and a configuration may also be employed in which the capacitance lines 7a extend in both the X-axis direction and the Y-axis direction.

Schematic Configuration of Pixel 100a

Figure 4:
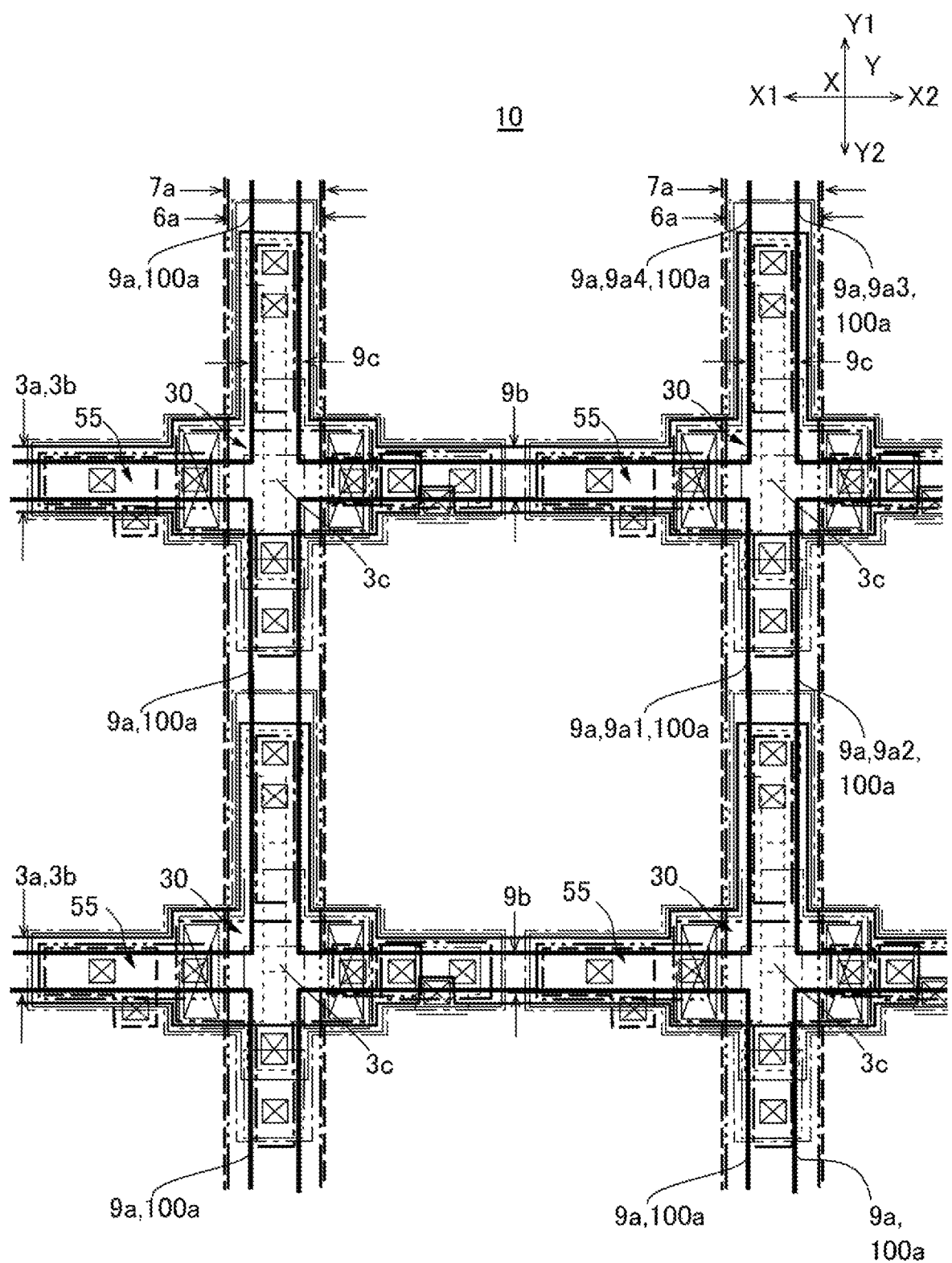
FIG. 4 is a plan view of a plurality of adjacent pixels in the electro-optical device illustrated in FIG. 1.
Figure 5:
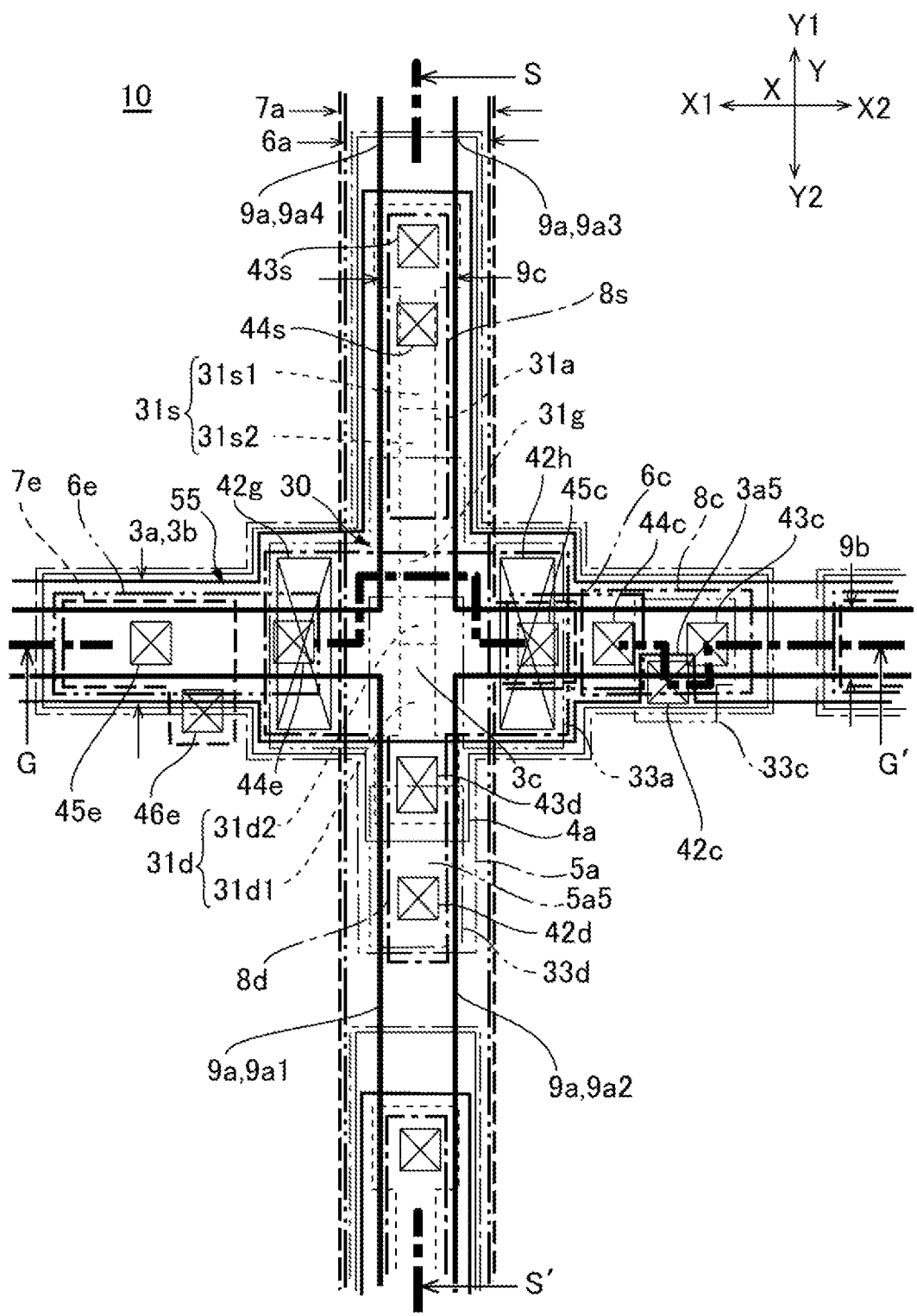
FIG. 5 is an enlarged plan view illustrating a vicinity of a transistor illustrated in FIG. 4.
Figure 6:
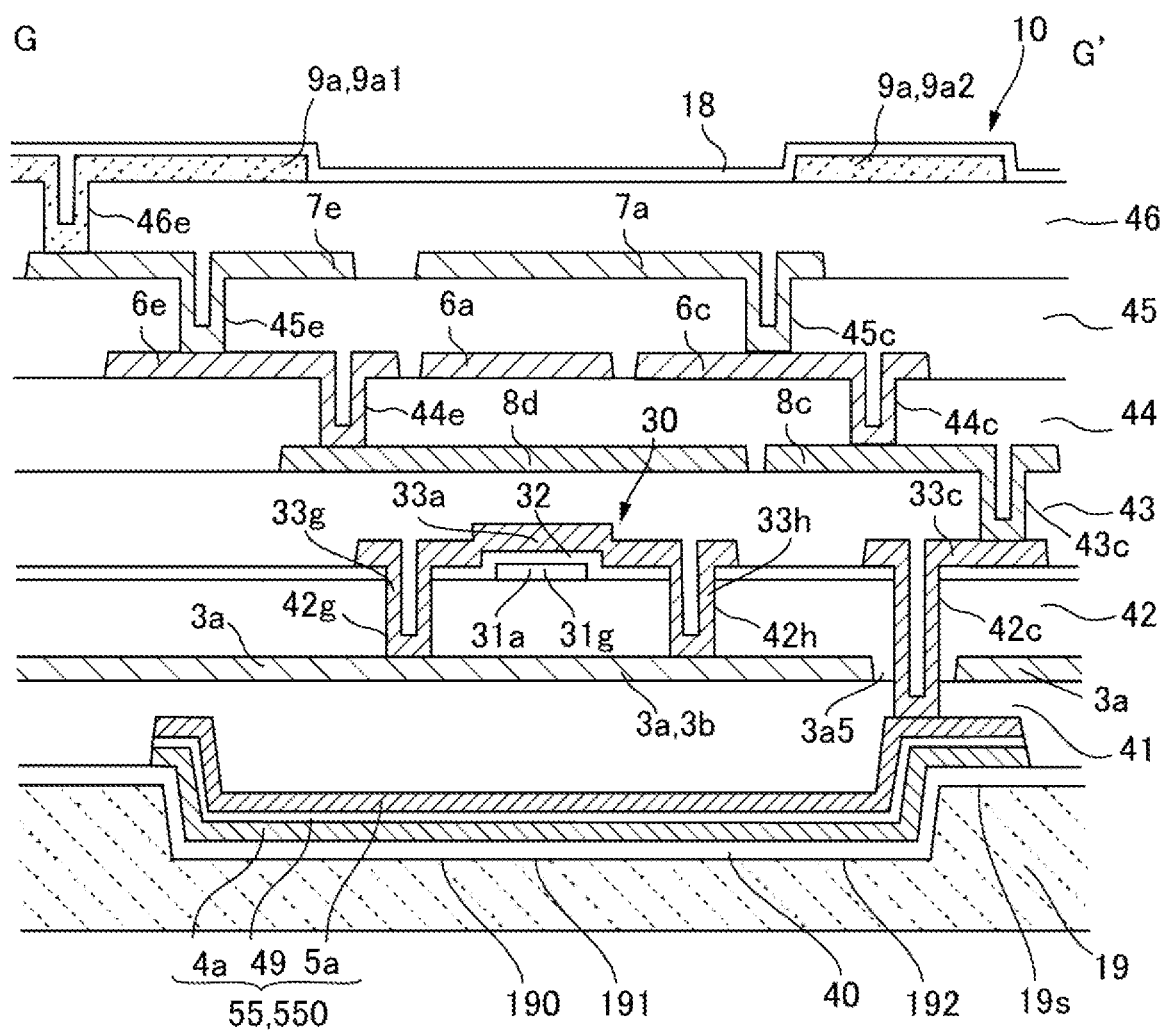
FIG. 6 is a cross-sectional view taken along a line G-G' in the vicinity of the transistor illustrated in FIG. 5.
Figure 7:
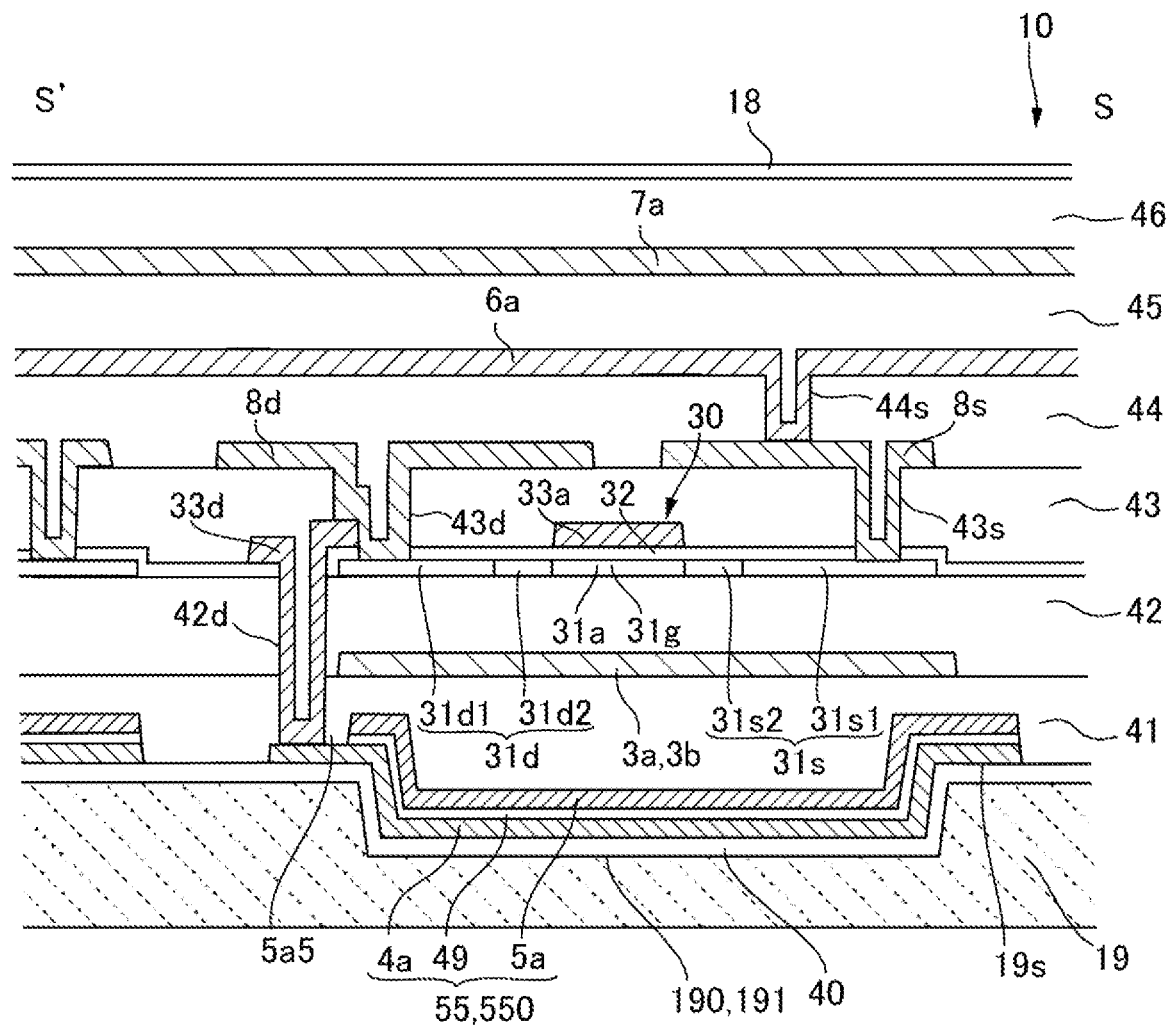
FIG. 7 is a cross-sectional view taken along a line S-S' in the vicinity of the transistor illustrated in FIG. 5.

FIG. 4 is a plan view of the plurality of adjacent pixels 100a in the electro-optical device 1 illustrated in FIG. 1. FIG. 5 is an enlarged plan view illustrating a vicinity of the transistor 30 illustrated in FIG. 4. FIG. 6 is a cross-sectional view taken along a line G-G' in the vicinity of the transistor 30 illustrated in FIG. 5. FIG. 6 schematically illustrates a state in which the transistor 30 and the like are cut along the scanning line 3a. FIG. 7 is a cross-sectional view taken along a line S-S' in the vicinity of the transistor 30 illustrated in FIG. 5. FIG. 7 schematically illustrates a state in which the transistor 30 and the like are cut along the data line 6a. Note that in FIGS. 4 and 5 and FIGS. 8 to 11 to be described later, layers are indicated by the lines below. Furthermore, in FIGS. 4 and 5 and FIGS. 8 to 11 to be described later, for layers of which ends overlap each other in plan view, the positions of the ends are shifted so that the shapes and the like of the layers are easily recognizable.

Scanning line 3a: a thick solid line
Semiconductor film 31a: a thin and short broken line
Gate electrode 33a: a thin two-dot-dash line
First capacitor electrode 4a: a thin dot-dash line
Second capacitor electrode 5a: a thin solid line
Relay electrodes 8c, 8d, and 8s: a thick dot-dash line
Data line 6a and relay electrodes 6c and 6d: a thin two-dot-dash line
Capacitance line 7a and relay electrode 7d: a thick and long broken line
Pixel electrode 9a: a very thick solid line As illustrated in FIGS. 4 and 5, in the first substrate 10, the pixel electrode 9a is formed in each of the plurality of pixels 100a. The scanning lines 3a, the data lines 6a, and the capacitance lines 7a extend along inter-pixel regions sandwiched between adjacent pixel electrodes 9a. More specifically, the scanning line 3a extends in the X-axis direction overlapping a first inter-pixel region 9b extending in the X-axis direction, while the data line 6a and the capacitance line 7a extend in the Y-axis direction overlapping a second inter-pixel region 9c extending in the Y-axis direction. In the first substrate 10, transistors 30 including semiconductor films 31a that correspond to intersections 3c between data lines 6a and scanning lines 3a are formed. The scanning lines 3a, the data lines 6a, and the capacitance lines 7a have light-shielding properties. Accordingly, a region in which the scanning line 3a, the data line 6a, the capacitance line 7a, and a conductive film in the same layer as these lines are formed is a light-shielding region through which light does not pass, while a region surrounded by light-shielding regions is an aperture region through which light is transmitted.

As illustrated in FIGS. 6 and 7, in the first substrate 10, on the first surface 19s side of the substrate body 19, an insulating film 40, and interlayer insulating films 41 to 46 are sequentially formed. For example, the surfaces of the interlayer insulating films 41, 42, and 46 are formed into a continuous flat surface by chemical-mechanical polishing (CMP) or the like. A capacitance element 55, the scanning line 3a serving as a light-shielding film 3b, the semiconductor film 31a of the transistor 30, a gate electrode 33a of the transistor 30, the data line 6a, and the capacitance line 7a are sequentially provided in a layer between the substrate body 19 and the pixel electrodes 9a.

Detailed Description of Each Layer

Figure 8:
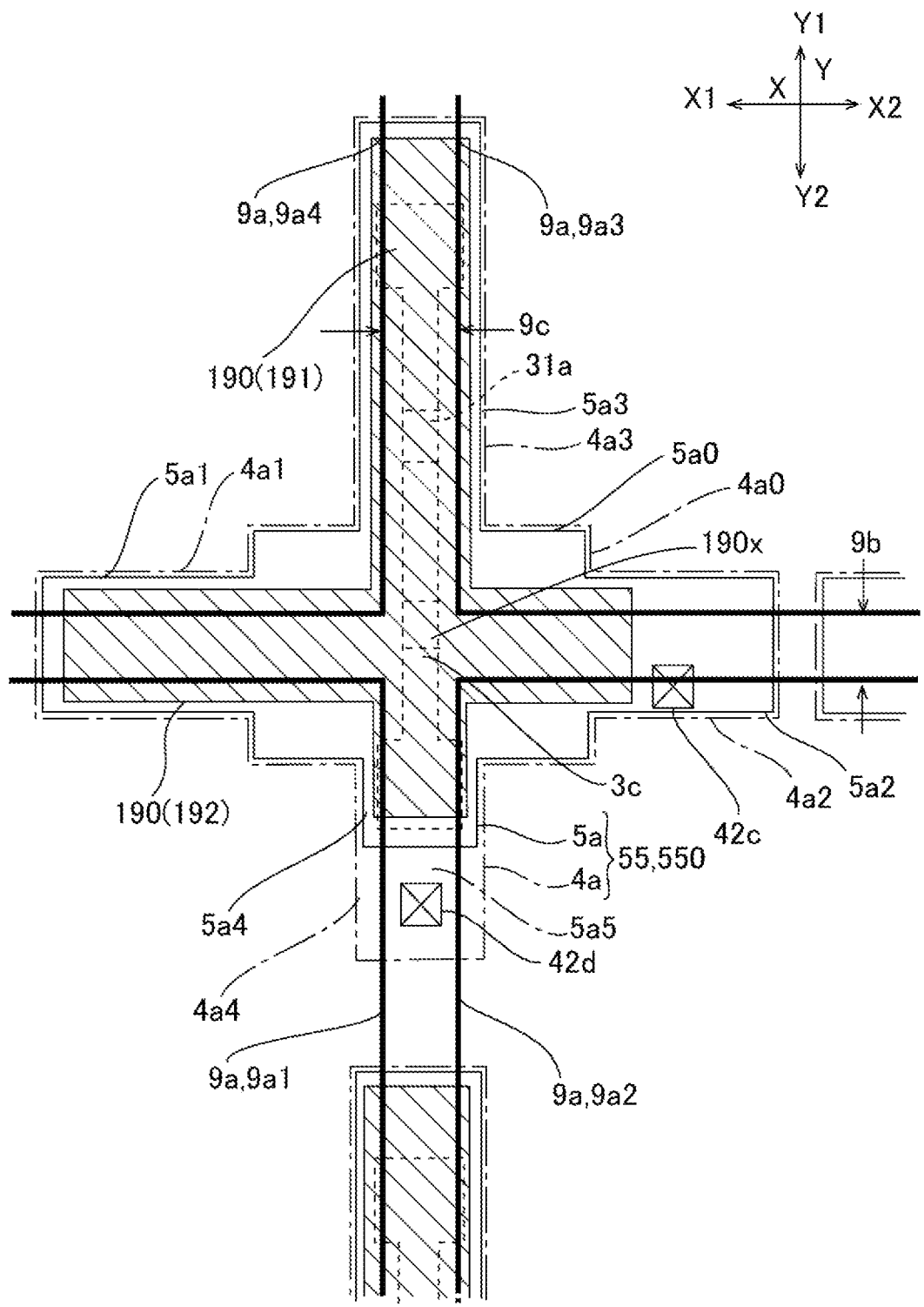
FIG. 8 is a plan view of a capacitance element illustrated in FIG. 5.
Figure 9:
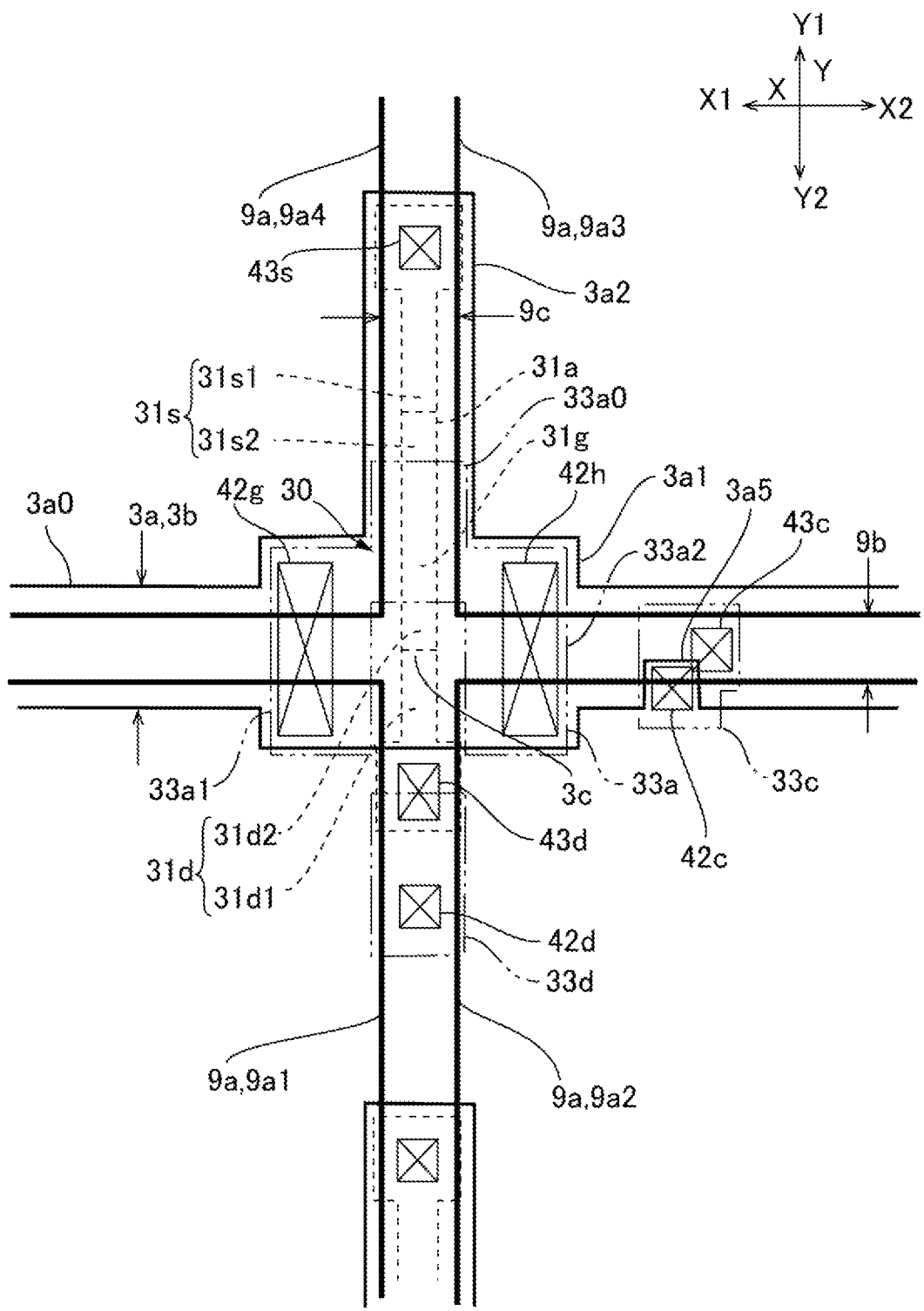
FIG. 9 is a plan view of the transistor illustrated in FIG. 5.
Figure 10:
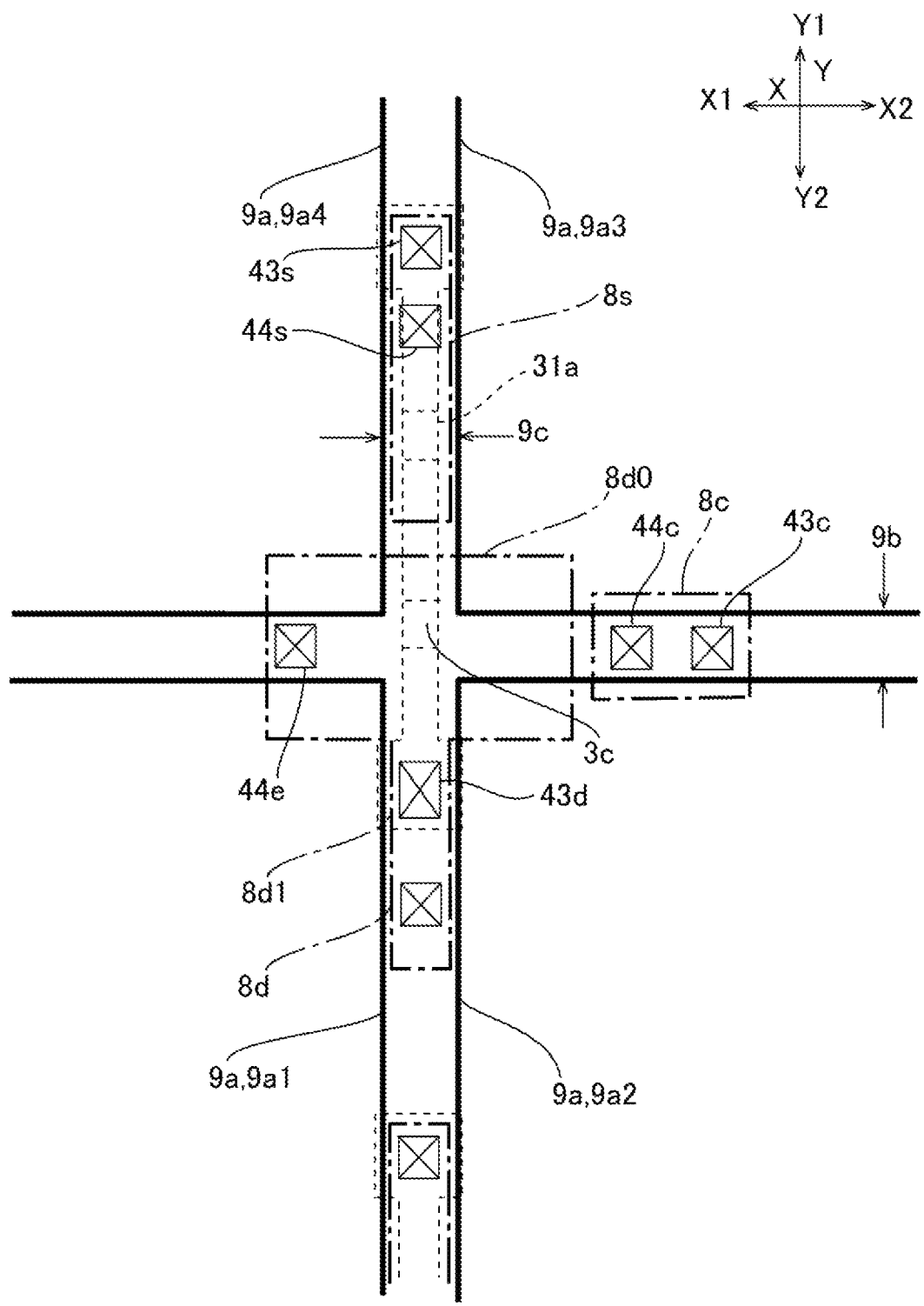
FIG. 10 is a plan view of relay electrodes illustrated in FIG. 5.
Figure 11:
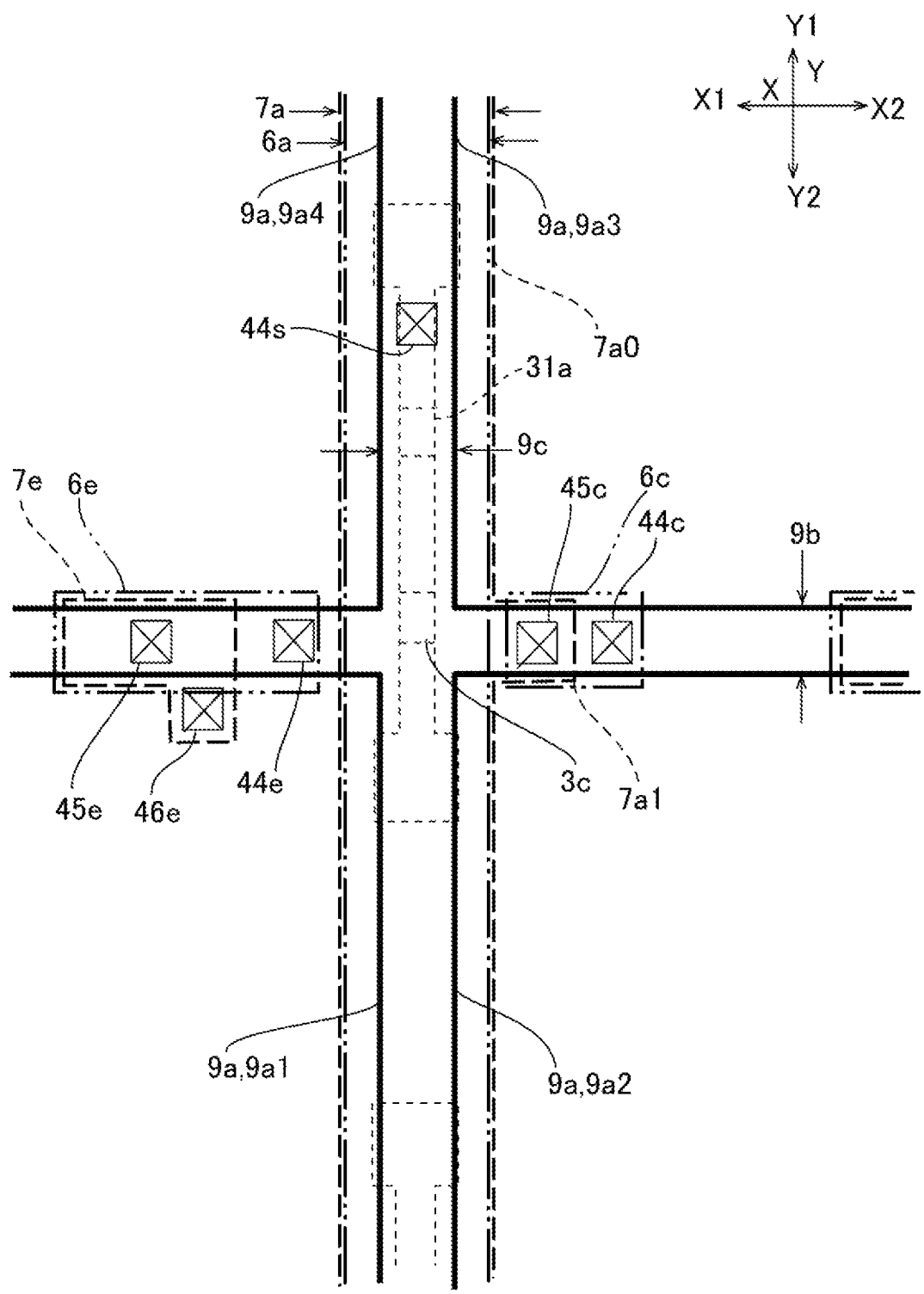
FIG. 11 is a plan view of a data line and a capacitance line illustrated in FIG. 5.

A detailed configuration of the first substrate 10 will be described with reference to FIGS. 5, 6, and 7, as well as with reference to FIGS. 8 to 11 described below as necessary. FIG. 8 is a plan view of the capacitance element 55 illustrated in FIG. 5. FIG. 9 is a plan view of the transistor 30 illustrated in FIG. 5. FIG. 10 is a plan view of the relay electrodes 8c, 8d, and 8s illustrated in FIG. 5. FIG. 11 is a plan view of the data line 6a and the capacitance line 7a illustrated in FIG. 5. Note that FIGS. 8, 9, 10, and 11 each illustrate contact holes related to the electrical coupling of the electrodes and the like illustrated in these drawings, and illustrate the semiconductor film 31a and pixel electrodes 9a to indicate a position serving as a reference.

As illustrated in FIGS. 5, 6, 7, and 8, between the substrate body 19 and the interlayer insulating film 41, a layered film 550 is provided in which a first conductive film 4a, a dielectric film 49, and a second conductive film 5a are sequentially layered from the substrate body 19 side. The layered film 550 constitutes the capacitance element 55. The dielectric film 49 is formed of a silicon nitride film, a silicon oxide film, or the like. For example, when the dielectric film 49 is a silicon nitride film, the dielectric film 49 is formed to have a film thickness of from 0.01 to 0.03 μm.

The first conductive film 4a includes a quadrangular body portion 4a0 overlapping the intersection 3c between the scanning line 3a and the data line 6a in plan view, a first protrusion 4a1 protruding from the body portion 4a0 to the first side X1 in the X-axis direction, and a second protrusion 4a2 protruding from the body portion 4a0 to the second side X2 in the X-axis direction. Furthermore, the first conductive film 4a includes a third protrusion 4a3 protruding from the body portion 4a0 to a first side Y1 in the Y-axis direction, and a fourth protrusion 4a4 protruding from the body portion 4a0 to a second side Y2 in the Y-axis direction. The first conductive film 4a is formed of a conductive silicon film, a metal silicide film, a metal film, a metal compound film, or the like. For example, when the first conductive film 4a is a conductive silicon film, the first conductive film 4a is formed to have a film thickness of from 0.03 to 0.2 μm.

The second conductive film 5a overlaps the first conductive film 4a with the dielectric film 49 disposed therebetween from the pixel electrode 9a side in plan view. More specifically, the second conductive film 5a includes a body portion 5a0 overlapping the body portion 4a0 in plan view, a first protrusion 5a1 overlapping the first protrusion 4a1 in plan view, a second protrusion 5a2 overlapping the second protrusion 4a2 in plan view, a third protrusion 5a3 overlapping the third protrusion 4a3 in plan view, and a fourth protrusion 5a4 overlapping the fourth protrusion 4a4 in plan view. The second conductive film 5a is formed of a conductive silicon film, a metal silicide film, a metal film, a metal compound film, or the like. For example, when the second conductive film 5a is a conductive silicon film, for example, the second conductive film 5a is formed to have a film thickness of from 0.03 to 0.2 μm.

The first conductive film 4a, the dielectric film 49, and the second conductive film 5a are collectively patterned portions. Accordingly, the first conductive film 4a, the dielectric film 49, and the second conductive film 5a have the same shape. However, a notch 5a5 is formed in the dielectric film 49 and the second conductive film 5a so as to expose an end of the fourth protrusion 4a4 of the first conductive film 4a.

Note that a groove 190 and the insulating film 40 are formed in a layer between the substrate body 19 and the capacitance element 55. Configurations and the like of the groove 190 and insulating film 40 will be described later.

As illustrated in FIGS. 5, 6, 7, and 9, in a layer between the interlayer insulating film 41 and the interlayer insulating film 42, the scanning line 3a extending in the X-axis direction is formed so as to overlap the first inter-pixel region 9b. The scanning line 3a includes a wiring portion 3a0 extending with a constant width in the X-axis direction, a wide portion 3a1 protruding from the wiring portion 3a0 to both sides in the Y-axis direction at the intersection 3c, and a protrusion 3a2 further protruding from the wide portion 3a1 to the first side Y1 in the Y-axis direction.

The scanning line 3a is a conductive light-shielding film 3b formed of a metal silicide film, a metal film, a metal compound film, or the like. In the present embodiment, the scanning line 3a is formed of a tungsten silicide film. For example, when the scanning line 3a is a tungsten silicide film, the scanning line 3a is formed to have a film thickness of from 0.1 to 0.4 μm.

Between the interlayer insulating film 42 and an interlayer insulating film 43 is formed the transistor 30 for pixel switching. The transistor 30 includes the semiconductor film 31a formed at a surface on the pixel electrode 9a side of the interlayer insulating film 42, a gate insulating film 32 covering the semiconductor film 31a from the pixel electrode 9a side, and the gate electrode 33a overlapping the semiconductor film 31a with the gate insulating film 32 disposed therebetween in plan view.

The gate electrode 33a includes a body portion 33a0 overlapping the semiconductor film 31a, and protrusions 33a1 and 33a2 protruding from both ends in the X-axis direction of the body portion 33a0 to the second side Y2 in the Y-axis direction. The gate electrode 33a includes a conductive film having light-shielding properties such as a metal silicide film, a metal film, and a metal compound film. In the present embodiment, the gate electrode 33a is formed of a layered film including a conductive polysilicon film and a metal film of aluminum or the like.

The semiconductor film 31a extends in the Y-axis direction so as to overlap the second inter-pixel region 9c. The semiconductor film 31a includes a channel region 31g overlapping the gate electrode 33a in plan view, a first source/drain region 31s adjacent to the channel region 31g on the first side Y1 in the Y-axis direction, and a second source/drain region 31d adjacent to the channel region 31g on the second side Y2 in the Y-axis direction. The transistor 30 has a lightly doped drain (LDD) structure. Accordingly, the second source/drain region 31d includes a high concentration region 31d1 in which impurities are introduced at a high concentration at a position spaced apart from the channel region 31g, and a low concentration region 31d2 in which impurities are introduced at a lower concentration than that of the high concentration region 31d1 between the channel region 31g and the high concentration region 31d1. The first source/drain region 31s includes a high concentration region 31s1 in which impurities are introduced at a high concentration at a position spaced apart from the channel region 31g, and a low concentration region 31s2 in which impurities are introduced at a lower concentration than that of the high concentration region 31s1 between the channel region 31g and the high concentration region 31s1. The width in the X-axis direction of the semiconductor film 31a is 0.3 μm, for example, and linearly extends in the Y-axis direction.

The semiconductor film 31a is constituted by a polysilicon film or the like. The gate insulating film 32 has a two-layer structure including a first gate insulating film formed of a silicon oxide film obtained by thermal oxidization of the semiconductor film 31a, and a second gate insulating film formed of a silicon oxide film formed by a low-pressure chemical vapor deposition (CVD) method or the like.

The wide portion 3a1 of the scanning line 3a overlaps the gate electrode 33a, the first source/drain region 31s, the channel region 31g, and the second source/drain region 31d in plan view. Furthermore, the wide portion 3a1 of the scanning line 3a and the protrusions 33a1 and 33a2 of the gate electrode 33a are electrically coupled to the scanning line 3a via groove-shaped contact holes 42g and 42h penetrating the gate insulating film 32 and the interlayer insulating film 42.

Between the gate insulating film 32 and the interlayer insulating film 43, a relay electrode 33c spaced apart from the gate electrode 33a to the second side X2 in the X-axis direction, and a relay electrode 33d spaced apart from the gate electrode 33a to the second side Y2 in the Y-axis direction are provided. The relay electrodes 33c and 33d are formed of the same conductive film as that of the gate electrode 33a.

At an end on the second side Y2 in the Y-axis direction of the wiring portion 3a0 of the scanning line 3a, a notch 3a5 is formed in a region overlapping the relay electrode 33c and the second conductive film 5a in plan view. In the gate insulating film 32, the interlayer insulating film 42, and the interlayer insulating film 41, a contact hole 42c is formed that passes through the notch 3a5 to reach the second conductive film 5a. Accordingly, the relay electrode 33c is electrically coupled to the second conductive film 5a via the contact hole 42c.

In the gate insulating film 32, the interlayer insulating film 42, and the interlayer insulating film 41, a contact hole 42d is formed that passes through the notch 5a5 to reach the first conductive film 4a. Accordingly, the relay electrode 33d is electrically coupled to the first conductive film 4a via the contact hole 42d.

As illustrated in FIGS. 5, 6, 7, and 10, between the interlayer insulating film 43 and the interlayer insulating film 44, a relay electrode 8s overlapping the first source/drain region 31s in plan view, a relay electrode 8d overlapping the second source/drain region 31d in plan view, and a relay electrode 8c overlapping the relay electrode 33c in plan view are formed spaced apart from each other. The relay electrodes 8c, 8d, and 8s are formed of a conductive film having light-shielding properties such as a metal silicide film, a metal film, and a metal compound film.

The relay electrode 8d includes a body portion 8d0 overlapping the gate electrode 33a in plan view, and a protrusion 8d1 protruding from the body portion 8d0 so as to overlap the second source/drain region 31d in plan view. The protrusion 8d1 is electrically coupled to the second source/drain region 31d via a contact hole 43d penetrating the interlayer insulating film 43 and the gate insulating film 32. Furthermore, since an end of the relay electrode 33d is exposed in the contact hole 43d, the protrusion 8d1 is electrically coupled to the relay electrode 33d.

The relay electrode 8s is electrically coupled to the first source/drain region 31s via a contact hole 43s penetrating the interlayer insulating film 43 and the gate insulating film 32. The relay electrode 8c is electrically coupled to the relay electrode 33c via a contact hole 43c penetrating the interlayer insulating film 43.

As illustrated in FIGS. 5, 6, 7, and 11, between the interlayer insulating film 44 and the interlayer insulating film 45, the data line 6a extending in the Y-axis direction so as to overlap the second inter-pixel region 9c in plan view, a relay electrode 6e spaced apart from the data line 6a to the first side X1 in the X-axis direction, and a relay electrode 6c spaced apart from the data line 6a to the second side X2 in the X-axis direction are provided. The data line 6a and the relay electrodes 6c and 6e are formed of a conductive film having light-shielding properties such as a metal silicide film, a metal film, and a metal compound film. For example, the width of the data line 6a is from 0.5 to 1 μm.

The data line 6a is electrically coupled to the relay electrode 8s via a contact hole 44s penetrating the interlayer insulating film 44. Accordingly, the data line 6a is electrically coupled to the first source/drain region 31s via the relay electrode 8s. The relay electrode 6e is electrically coupled to the relay electrode 8d via a contact hole 44e penetrating the interlayer insulating film 44. The relay electrode 6c is electrically coupled to the relay electrode 8c via a contact hole 44c penetrating the interlayer insulating film 44.

Between the interlayer insulating film 45 and the interlayer insulating film 46, the capacitance line 7a extending in the Y-axis direction so as to overlap the data line 6a in plan view, and a relay electrode 7e spaced apart from the capacitance line 7a to the first side X1 in the X-axis direction are provided. The capacitance line 7a and the relay electrode 7e are formed of a conductive film having light-shielding properties such as a metal silicide film, a metal film, and a metal compound film.

The capacitance line 7a includes a wiring portion 7a0 extending in the Y-axis direction, and a protrusion 7a1 protruding from a portion overlapping the intersection 3c of the wiring portion 7a0 to the second side X2 in the X-axis direction. The protrusion 7a1 is electrically coupled to the relay electrode 6c via a contact hole 45c penetrating the interlayer insulating film 45. Accordingly, the capacitance line 7a is electrically coupled to the second conductive film 5a of the capacitance element 55 via the relay electrode 6c, the relay electrode 8c, and the relay electrode 33c. The width of the wiring portion 7a0 is from 0.5 to 1 μm.

The relay electrode 7e is electrically coupled to the relay electrode 6e via a contact hole 45e penetrating the interlayer insulating film 45. Furthermore, the pixel electrode 9a is electrically coupled to the relay electrode 7e via a contact hole 46e penetrating the interlayer insulating film 46. In the present embodiment, of four pixel electrodes 9a1, 9a2, 9a3, and 9a4 adjacent to each other around the contact hole 46e, the pixel electrode 9a1 located on the second side Y2 in the Y-axis direction of the contact hole 46e is electrically coupled to the relay electrode 7e via the contact hole 46e.

As a result, the pixel electrode 9a is electrically coupled to the second source/drain region 31d via the relay electrode 7e, the relay electrode 6e, and the relay electrode 8d. Accordingly, when the transistor 30 is brought into the on state, an image signal is supplied from the data line 6a to the pixel electrode 9a. Furthermore, the pixel electrode 9a is electrically coupled to the first conductive film 4a of the capacitance element 55 via the relay electrode 7e, the relay electrode 6e, the relay electrode 8d, and the relay electrode 33d.

In the electro-optical device 1 configured in this way, on the pixel electrode 9a side of the semiconductor film 31a, the capacitance line 7a, the data line 6a, and the relay electrode 8d overlap the semiconductor film 31a in plan view. Accordingly, light incident from the pixel electrode 9a side is less likely to be incident on the channel region 31g and the low concentration region 31d2 of the semiconductor film 31a. Furthermore, on the substrate body 19 side of the semiconductor film 31a, the scanning line 3a overlaps the semiconductor film 31a in plan view. Accordingly, even when return light of the light emitted from the substrate body 19 is incident from the substrate body 19 side, light is less likely to be incident on the channel region 31g and the low concentration region 31d2 of the semiconductor film 31a. Furthermore, of the gate electrode 33a, portions of the gate electrode 33a located within the contact holes 42g and 42h constitute light-shielding walls for the channel region 31g and the low concentration region 31d2 of the semiconductor film 31a. Accordingly, light from the X-axis direction toward the channel region 31g and the low concentration region 31d2 can be blocked by the gate electrode 33a located within the contact holes 42g and 42h. Therefore, according to the present embodiment, degradation in characteristics of the transistor 30 resulting from photocurrent is less likely to occur.

Configuration of Groove 190 and Insulating Film 40

Figure 12:
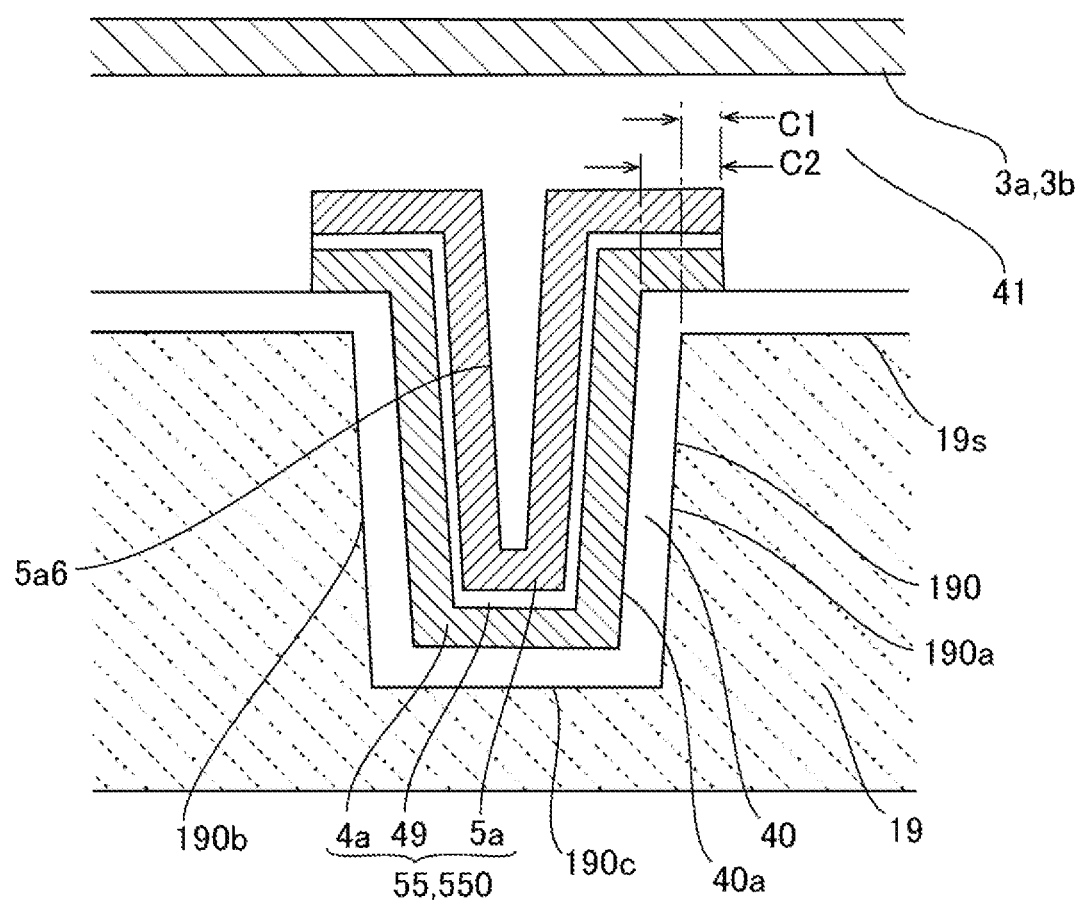
FIG. 12 is a cross-sectional view of a vicinity of the groove illustrated in FIG. 8.
Figure 13:
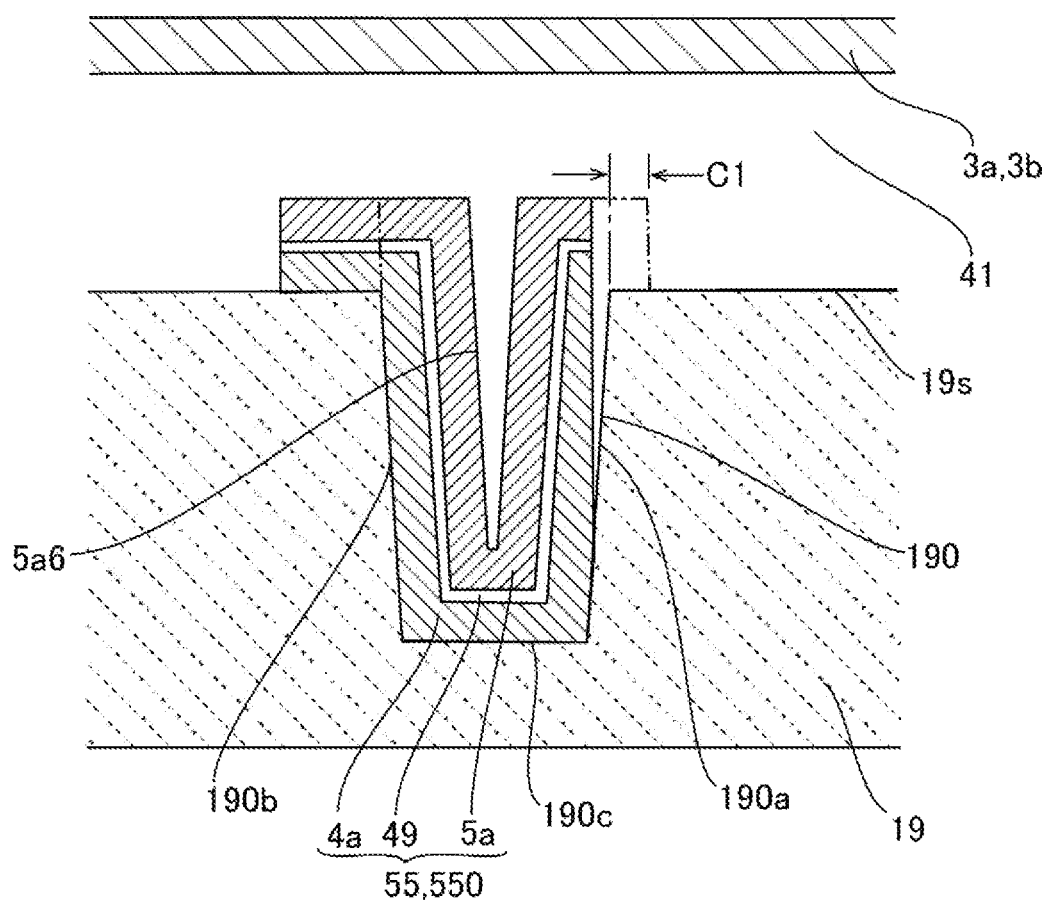
FIG. 13 is a cross-sectional view of a vicinity of a groove in a reference example of the present disclosure.
Figure 14:
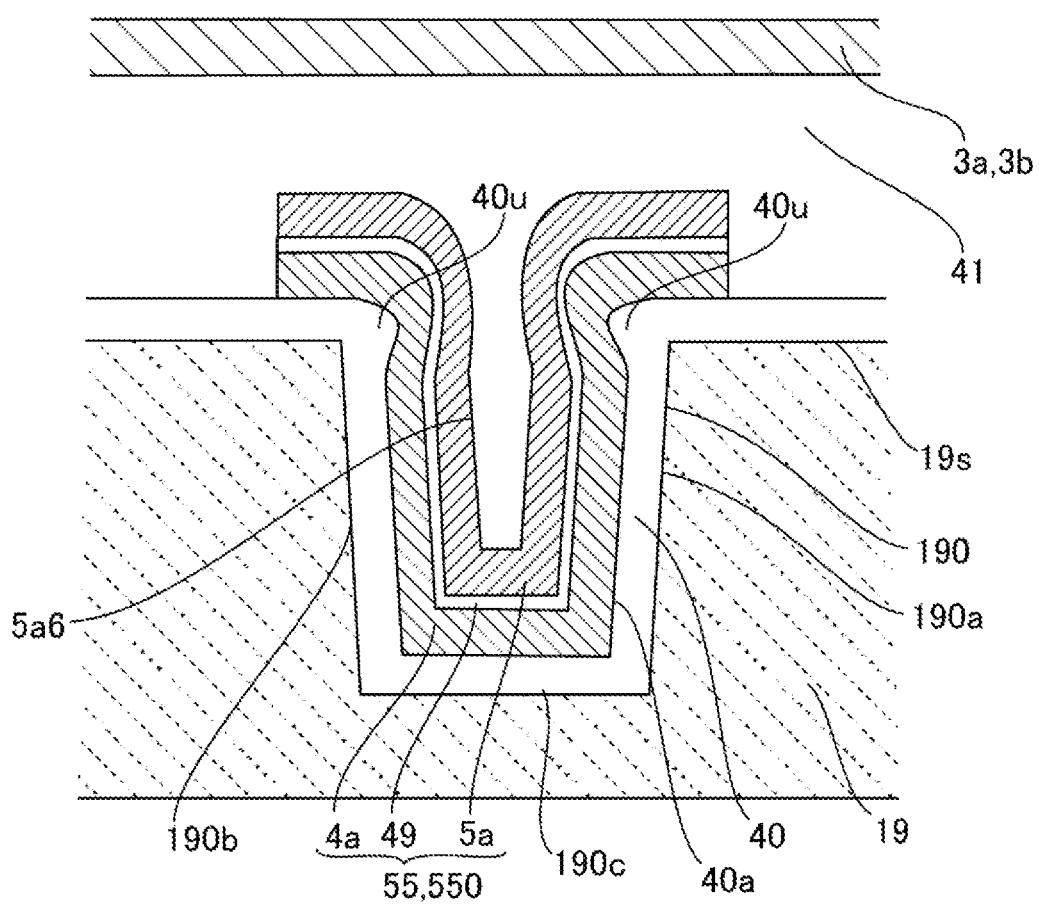
FIG. 14 is an explanatory diagram of a protrusion of the insulating film illustrated in FIG. 8.

FIG. 12 is a cross-sectional view in a width direction of a vicinity of the groove 190 illustrated in FIG. 8. FIG. 13 is a cross-sectional view of a vicinity of the groove 190 in a reference example of the present disclosure. FIG. 14 is an explanatory diagram of a protrusion of the insulating film 40 illustrated in FIG. 8.

Between the substrate body 19 and the pixel electrode 9a, between the substrate body 19 and the capacitance element 55, the groove 190 depressed to the opposite side from the pixel electrode 9a, and the insulating film 40 on the pixel electrode 9a side of a region including the groove 190 are formed. In other words, the groove 190 is depressed toward the substrate body 19 side. In the present embodiment, the first groove 191 and the plurality of second grooves are formed in the surface on the pixel electrode 9a side of the substrate body 19. In the capacitance element 55, the layered film 550 including the first conductive film 4a, the dielectric film 49, and the second conductive film 5a is sequentially layered on the insulating film 40. The insulating film 40 is overlaid along side surfaces 190a and 190b and a bottom surface 190c of the groove 190. A groove-shaped recess 40a having a width narrower than that of the groove 190 is formed in a surface on the pixel electrode 9a side of the insulating film 40. Accordingly, on the inner side of the recess 40a, the first conductive film 4a overlaps the side surfaces 190a and 190b and the bottom surface 190c of the groove 190 with the insulating film 40 disposed therebetween; the dielectric film 49 overlaps the side surfaces 190a and 190b and the bottom surface 190c of the groove 190 with the first conductive film 4a and the insulating film 40 disposed therebetween; and the second conductive film 5a overlaps the side surfaces 190a and 190b and the bottom surface 190c of the groove 190 with the dielectric film 49, the first conductive film 4a, and the insulating film 40 disposed therebetween. Therefore, the capacitance element 55 has a greater capacitance than when the first conductive film 4a, the dielectric film 49, and the second conductive film 5a are layered on a flat surface alone. Furthermore, the depth of depression of the groove 190 is deeper than the total film thickness of the insulating film 40 and the layered film 550, and the insulating film 40 and the layered film 550 are uniformly formed by a CVD method or the like, which makes it possible to form a capacitance element 55 having a stable capacitance. Furthermore, the width of the bottom surface of the layered film 550 is narrower than the width of the bottom surface of the groove 190, and the layered film 550 is disposed along the opening edges on both sides of the insulating film 40, which makes it possible to form a capacitance element 55 having a stable capacitance.

A groove-shaped recess 5a6 resulting from the groove 190 is formed in a surface on the pixel electrode 9a side of the second conductive film 5a. Here, because the insulating film 40 is formed within the groove 190, the recess 5a6 reflects the shape of the recess 40a of the insulating film 40. Accordingly, the recess 5a6 is narrow in width, and is thus easily filled by the interlayer insulating film 41. For example, the interlayer insulating film 41 is formed of a silicon oxide film or the like, is formed to have a film thickness of from 0.2 to 0.5 μm, and has a shape with a good step coverage with the recess 5a6 being filled.

In the present embodiment, the opening width of the groove 190 is from 0.6 μm to 1.0 μm, and the width of the bottom surface 190c of the groove 190 is from 0.4 μm to 0.8 μm. The depth of the groove 190 is 1 μm or greater. For example, the depth of the groove 190 is from 1 μm to 2 μm. The insulating film 40 is formed of a silicon oxide film or the like, and has a thickness of from 0.05 μm to 0.3 μm. Accordingly, the opening width of the recess 40a is from 0.4 μm to 0.7 μm. In a portion extending along the groove 190, the widths of the first conductive film 4a and the second conductive film 5a are from 0.7 μm to 0.9 μm. Accordingly, a clearance C1 between the opening edges of the groove 190 and the ends of the second conductive film 5a is approximately 0.1 μm. A clearance C2 between the opening edges of the recess 40a and the ends of the second conductive film 5a is 0.2 μm or greater.

In the present embodiment, the groove 190 includes a first groove 191 extending so as to overlap one of the scanning line 3a and the data line 6a, and a second groove 192 extending so as to overlap the other of the scanning line 3a and the data line 6a. In the present embodiment, the first groove 191 linearly extends in the Y-axis direction so as to overlap the data line 6a and the semiconductor film 31a, while the second groove 192 linearly extends so as to overlap the scanning line 3a. An intersection 190x between the first groove 191 and the second groove 192 is present in the groove 190.

Such a structure is achieved by performing the following steps in the manufacturing process of the electro-optical device 1. In the first step, the groove 190 is formed using a photolithographic technique or the like. Then, in the second step, the insulating film 40 is formed in a region including the groove 190. A plasma CVD method that uses tetraethoxysilane is used to form the insulating film 40. Furthermore, a method of forming a silicon film and then thermal oxidizing the silicon film may be employed to form the insulating film 40. Next, in the third step, the first conductive film 4a overlapping the side surfaces 190a and 190b and the bottom surface 190c of the groove 190 with the insulating film 40 disposed therebetween is formed. Then, in the fourth step, the dielectric film 49 overlapping the side surfaces 190a and 190b and the bottom surface 190c of the groove 190 with the first conductive film 4a and the insulating film 40 disposed therebetween is formed. Next, in the fifth step, the second conductive film 5a overlapping the side surfaces 190a and 190b and the bottom surface 190c of the groove 190 with the dielectric film 49, the first conductive film 4a, and the insulating film 40 disposed therebetween is formed. Thereafter, the layered film 550 including the first conductive film 4a, the dielectric film 49, and the second conductive film 5a are collectively patterned using a photolithographic technique or the like to form the capacitance elements 55.

In the present embodiment, the clearance C1 in the width direction between the opening edges of the groove 190 and the ends of the capacitance element 55 is reduced to near the processing limit so that the capacitance element 55 does not greatly overhang the scanning line 3a and the data line 6a to decrease the pixel aperture ratio. In this case as well, in the present embodiment, since the insulating film 40 is layered within the groove 190, even when the clearance C1 in the width direction between the ends of the capacitance element 55 and the opening edges of the groove 190 is small, the clearance C2 in the width direction between the ends of the capacitance element 55 and the opening edges of the groove-shaped recess 40a is large. Therefore, even when the width dimensions or positions of the groove 190 and the capacitance element 55 are shifted, a situation in which an end of the capacitance element 55 falls down on the inner side of the recess 40a is less likely to occur. Therefore, even when the clearance in the width dimension between the ends of the groove 190 and the ends of the capacitance element 55 is reduced, the capacitance elements 55 can be appropriately provided because variation in capacitance of the capacitance elements 55, a short circuit between the first conductive film 4a and the second conductive film 5a, or the like is less likely to occur.

In contrast, as illustrated in FIG. 13, in a case in which the insulating film 40 is not layered within the groove 190, the clearance obtained when the layered film 550 including the first conductive film 4a, the dielectric film 49, and the second conductive film 5a is patterned to form the capacitance element 55 corresponds to the narrow clearance C1 in the width direction between the ends of the capacitance element 55 and the opening edges of the groove 190. Accordingly, when the positions of the groove 190 and the capacitance element 55 are shifted from the design positions indicated by the two-dot-dash line, an end of the capacitance element 55 will fall down on the inner side of the groove 190, causing variation in capacitance of the capacitance elements 55 or a short circuit between the first conductive film 4a and the second conductive film 5a. However, in the present embodiment, such a defect is less likely to occur.

Furthermore, in the present embodiment, as illustrated in FIG. 14, when the insulating film 40 is formed after the groove 190 is formed, in some cases, a protrusion 40u protruding from an opening edge of the groove 190 toward the inner side of the groove 190 is formed in the insulating film 40. In such a case, the first conductive film 4a, the dielectric film 49, and the second conductive film 5a are formed along the protrusion 40u, so the capacitance of the capacitance element 55 can be increased.

Embodiment 2

Figure 15:
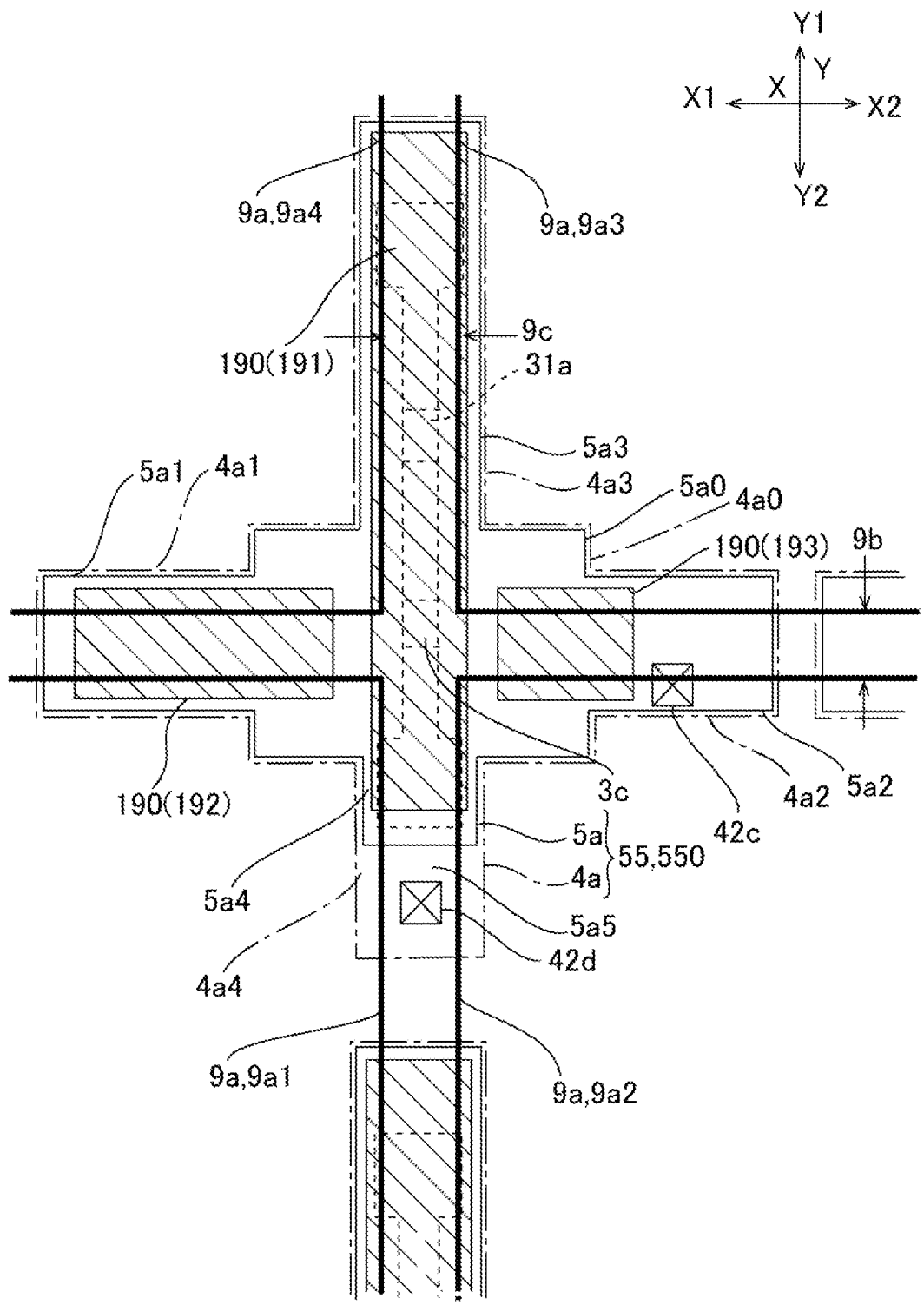
FIG. 15 is an explanatory diagram of an electro-optical device according to Embodiment 2 of the present disclosure.
Figure 16:
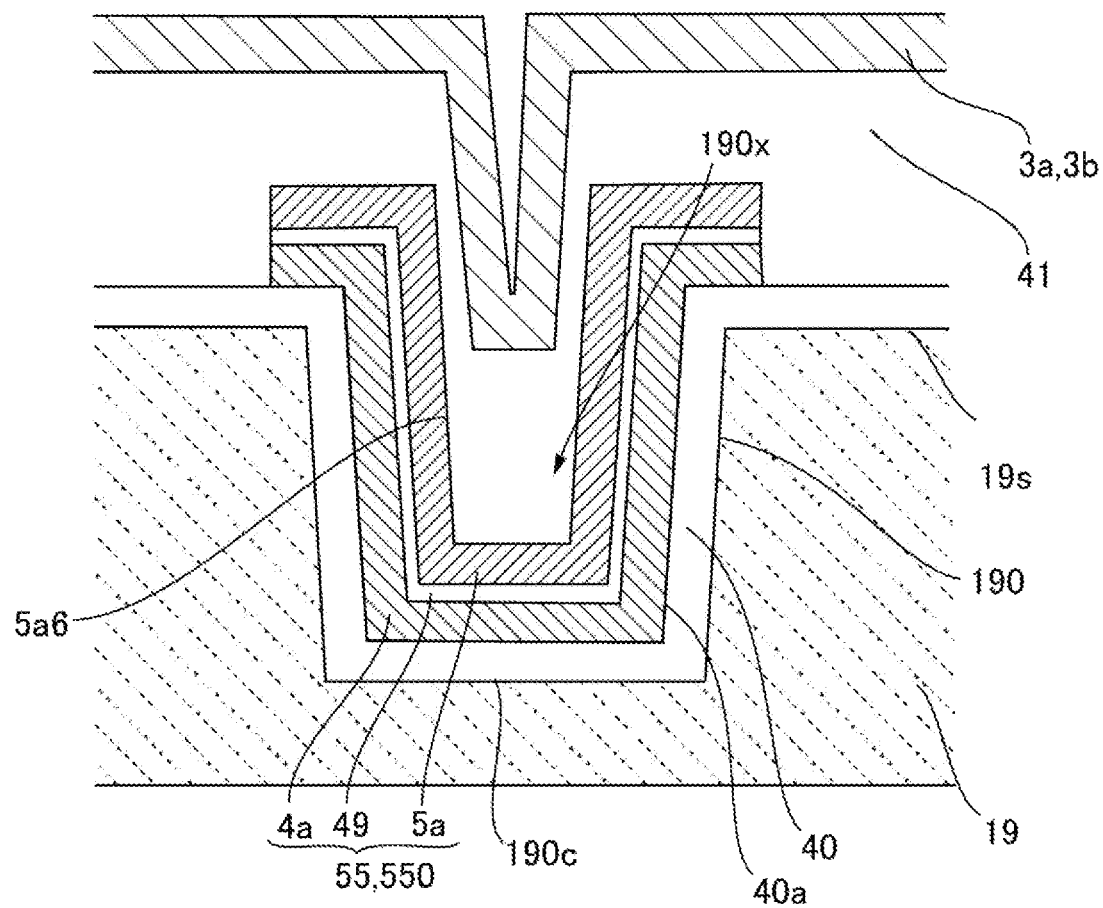
FIG. 16 is an explanatory diagram illustrating an effect of the configuration illustrated in FIG. 15.

FIG. 15 is an explanatory diagram of the electro-optical device 1 according to Embodiment 2 of the present disclosure. FIG. 15 illustrates a planar structure of the groove 190 and the like. FIG. 16 is an explanatory diagram illustrating an effect of the configuration illustrated in FIG. 15. Note that the basic configurations of the present embodiment are similar to those of Embodiment 1. Thus, common portions are assigned the same reference signs and description thereof will be omitted.

In the first embodiment, in the groove 190, the first groove 191 and the second groove 192 intersect each other. In the present embodiment, however, as illustrated in FIG. 15, second grooves 192 and 193 extending in the X-axis direction are provided on both sides in the width direction of the first groove 191 extending in the Y-axis direction. Here, the second grooves 192 and 193 do not intersect the first groove 191 extending in the Y-axis direction. More specifically, the second grooves 192 and 193 are provided at positions spaced apart from the first groove 191 in the X-axis direction, and do not intersect the first groove 191. Accordingly, the intersection 190x illustrated in FIG. 8 is not present in the groove 190. Here, in the intersection 190x, the opening width of the groove 190 in directions diagonal to the first groove 191 and the second groove 192 is widened. In the present embodiment, however, since the intersection 190x is not present, the groove 190 has a narrow groove width at any position. Therefore, even in a case in which the recess 5a6 resulting from the groove 190 is generated in the surface of the second conductive film 5a, the recess 5a6 in the surface of the second conductive film 5a is easily filled by the interlayer insulating film 41 deposited on the side surfaces of the recess 5a6 when the interlayer insulating film 41 is formed. Accordingly, even when the first insulating film 41 is formed and then chemical-mechanical polishing is performed, the film thickness need not be thick when the first insulating film 41 is formed, so the film formation time for the first insulating film 41 is shortened.

In contrast, as illustrated in FIG. 8, in a case in which the first groove 191 and the second groove 192 intersect each other, the groove width in directions diagonally intersecting the first groove 191 and the second groove 192 is easily widened at the intersection 191x when etching is performed to form the grooves. Thus, as illustrated in FIG. 16, in some cases, the recess 5a6 is less likely to be filled by the interlayer insulating film 41. In this case, stress applied to the scanning line 3a formed at the surface of the interlayer insulating film 41 can generate cracks. Furthermore, in a case in which the first insulating film 41 is formed and then chemical-mechanical polishing is performed to flatten the same, the film thickness need to be thick when the interlayer insulating film 41 is formed, so the film formation time for the interlayer insulating film 41 is lengthened. Therefore, compared to the Embodiment 1, Embodiment 2 may be preferable.

Embodiment 3

Figure 17:
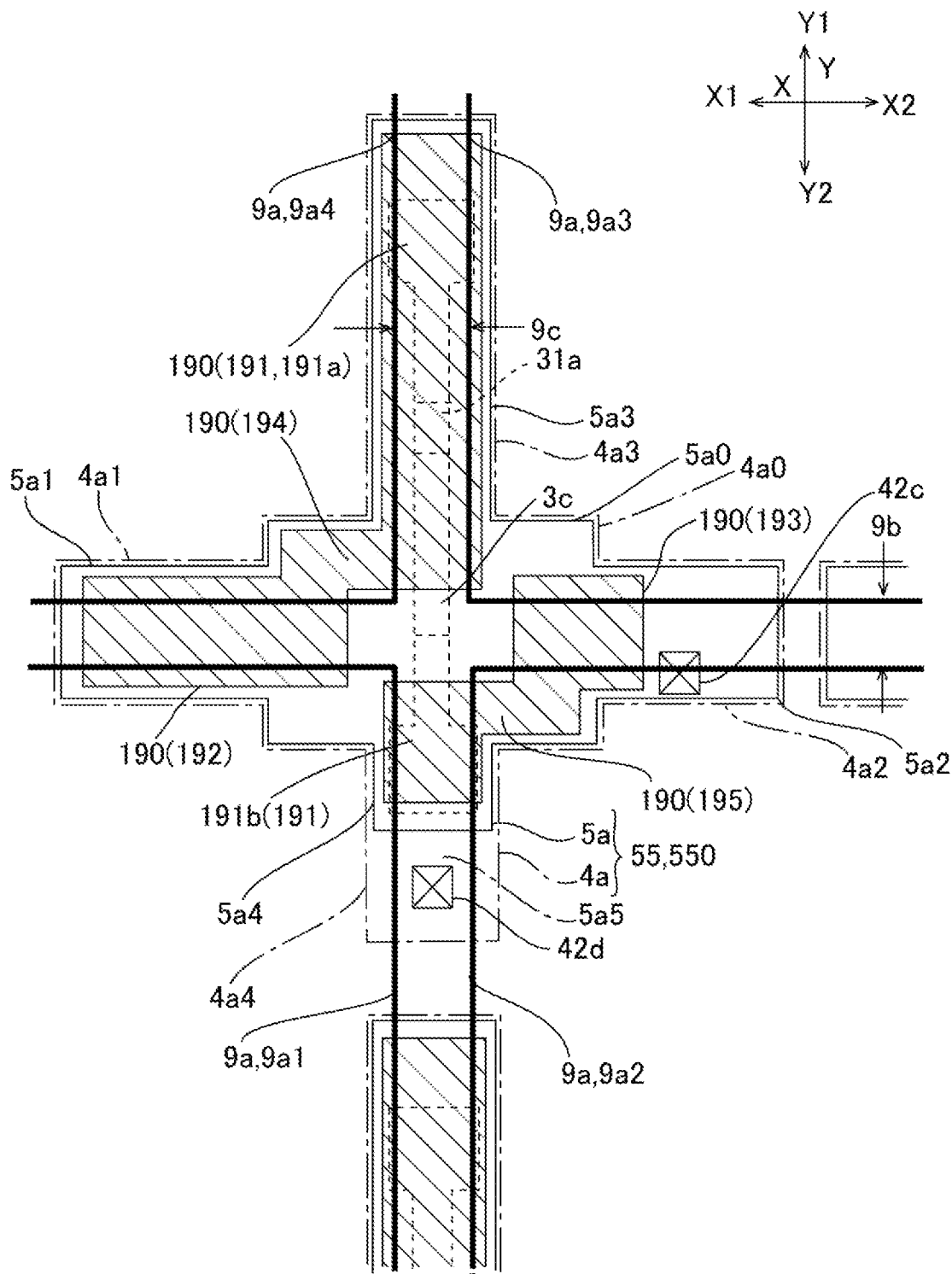
FIG. 17 is an explanatory diagram of an electro-optical device according to Embodiment 3 of the present disclosure.

FIG. 17 is an explanatory diagram of the electro-optical device 1 according to Embodiment 3 of the present disclosure. FIG. 17 illustrates a planar structure of the groove 190 and the like. Note that the basic configurations of the present embodiment are similar to those of Embodiments 1 and 2. Thus, common portions are assigned the same reference signs and description thereof will be omitted.

In Embodiment 2, in the groove 190, the second grooves 192 and 193 are provided on both sides of one first groove 191 extending in the Y-axis direction. In the present embodiment, however, as illustrated in FIG. 17, in the groove 190, the first groove 191 is interrupted at an intermediate position in the extending direction, and the first groove 191 includes a first portion 191a, and a second portion 191b located on the second side Y2 in the Y-axis direction of the first portion 191a. In the present embodiment as well, the groove 190 includes the second grooves 192 and 193 on both sides of the first groove 191. Further, the groove 190 includes second grooves 194 and 195 extending in the X-axis direction on both sides of the first groove 191.

Here, the first portion 191a of the first groove 191 and the second groove 194 are coupled to each other at an end thereof but do not intersect each other; and the second groove 194 and the second groove 192 are coupled to each other at an end thereof but do not intersect each other. Furthermore, the second portion 191b of the first groove 191 and the second groove 195 are coupled to each other at an end thereof but do not intersect each other; and the second groove 195 and the second groove 193 are coupled to each other at an end thereof but do not intersect each other. Accordingly, since the intersection 190x described above with reference to FIG. 16 is not present in any of the first portion 191a of the first groove 191, the second portion 191b of the first groove 191, and the second grooves 192, 193, 194, and 195, the groove width is narrow. Therefore, even in a case in which the recess 5a6 is generated in the surface of the second conductive film 5a, the interlayer insulating film 41 easily fills the recess 5a6 when the interlayer insulating film 41 is formed.

Embodiment 4

Figure 18:
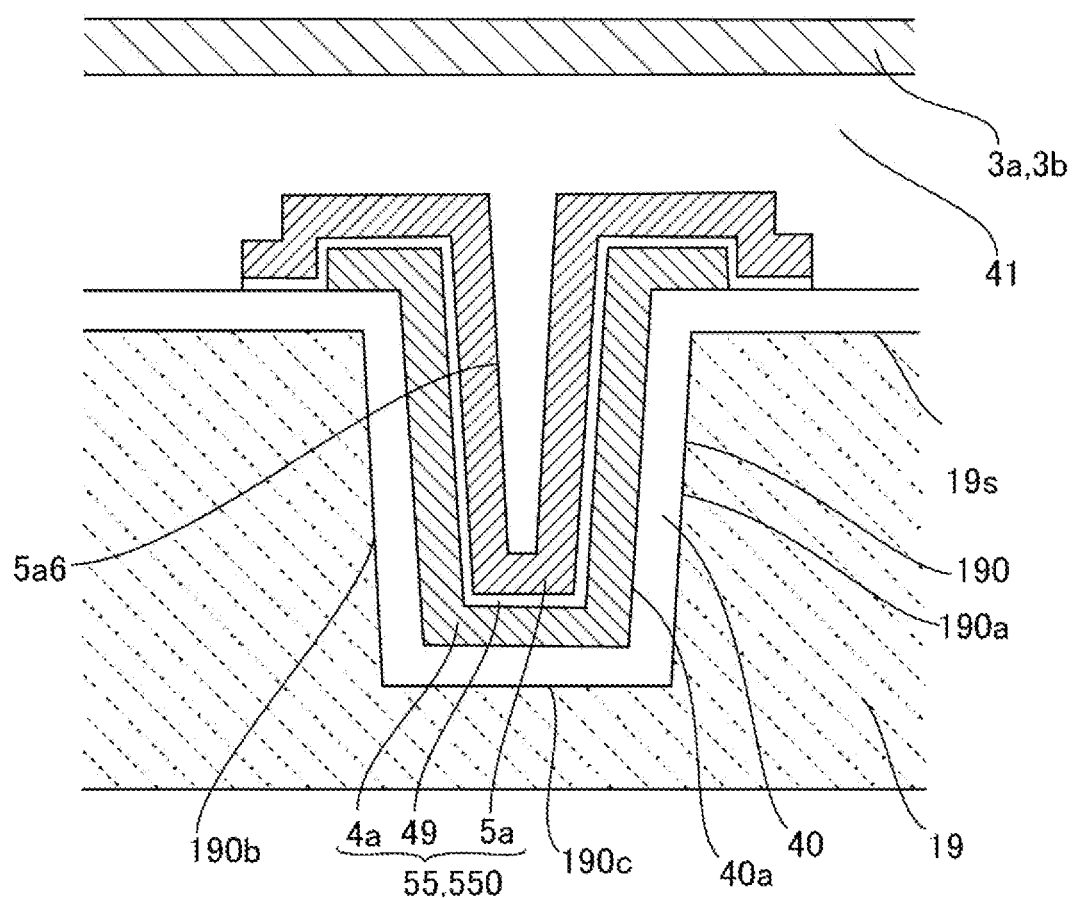
FIG. 18 is an explanatory diagram of an electro-optical device according to Embodiment 4 of the present disclosure.

FIG. 18 is an explanatory diagram of the electro-optical device 1 according to Embodiment 4 of the present disclosure. FIG. 18 schematically illustrates a cross-section of the capacitance element 55. Note that the basic configurations of the present embodiment are similar to those of Embodiments 1 and 2. Thus, common portions are assigned the same reference signs and description thereof will be omitted.

In Embodiments 1 and 2, examples in which the first conductive film 4a, the dielectric film 49, and the second conductive film 5a are collectively patterned are described. However, as illustrated in FIG. 18, for example, the dielectric film 49 and the second conductive film 5a may be formed after the first conductive film 4a is patterned by etching, with the dielectric film 49 and the second conductive film 5a collectively patterned thereafter. In this case, when the second conductive film 5a is formed in a wider range than that of the first conductive film 4a, the first conductive film 4a can avoid being etched when the second conductive film 5a is patterned.

Embodiment 5

Figure 19:
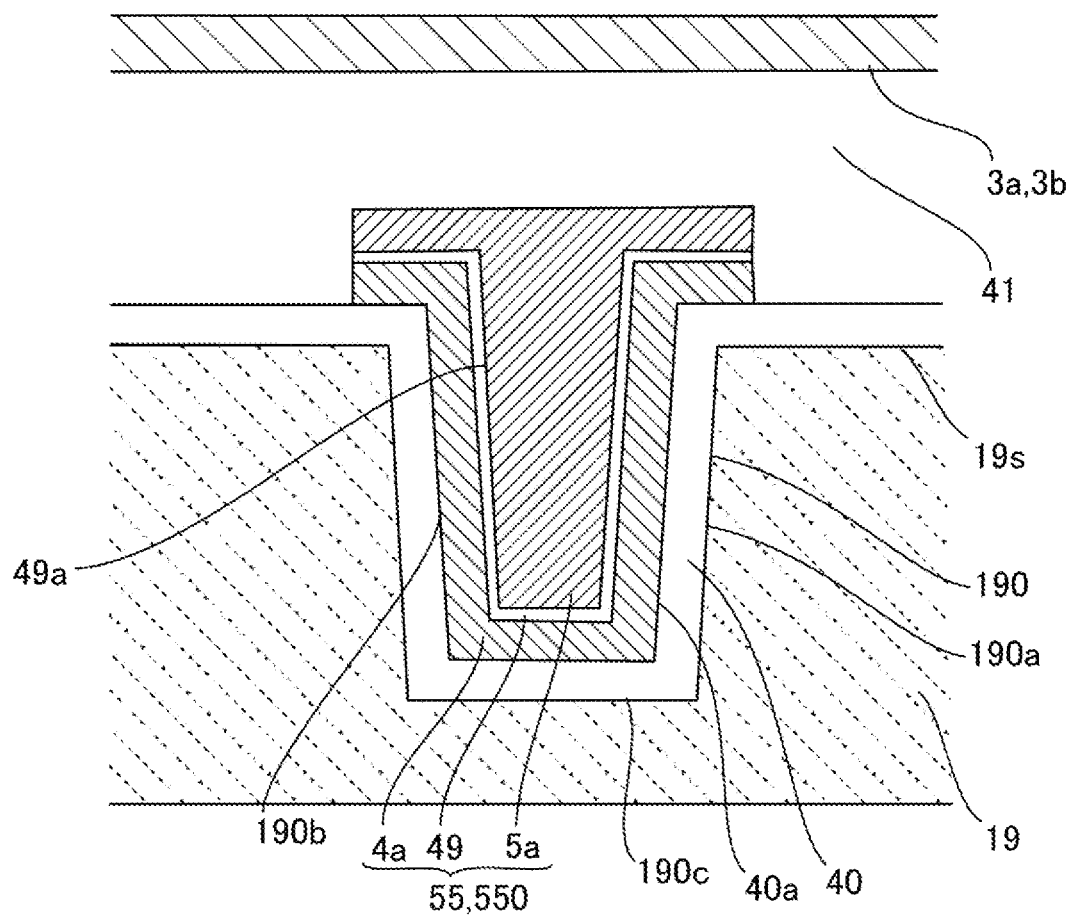
FIG. 19 is an explanatory diagram of an electro-optical device according to Embodiment 5 of the present disclosure.

FIG. 19 is an explanatory diagram of the electro-optical device 1 according to Embodiment 5 of the present disclosure. FIG. 19 schematically illustrates a cross-section of the capacitance element 55. Note that the basic configurations of the present embodiment are similar to those of Embodiments 1 and 2. Thus, common portions are assigned the same reference signs and description thereof will be omitted.

Embodiments 1 and 2 have a structure in which the recess 5a6 generated in the surface of the second conductive film 5a due to the groove 190 is filled by the interlayer insulating film 41. However, as illustrated in FIG. 19, a structure may be employed in which a recess 49a generated in the surface of the dielectric film 49 due to the groove 190 is filled by the second conductive film 5a.

Other Embodiments

In the above-described embodiments, cases have been described in which the light-shielding film 3b provided between the transistor 30 and the substrate body 19 is the scanning line 3a. However, when the gate electrode 33a is part of the scanning line, the light-shielding film 3b may be a light-shielding film separate from the scanning line.

In the above-described embodiments, the semiconductor film 31a extends in the Y-axis direction. However, the present disclosure may be applied to cases in which the semiconductor film 31a extends in the X-axis direction. Furthermore, in the above-described embodiments, the first groove 191 extends in the Y-axis direction. However, the present disclosure may be applied to cases in which the first groove 191 extends in the X-axis direction.

In the above-described embodiments, cases have been described in which the transistor 30 has an LDD structure. However, the present disclosure may be applied to cases of an offset gate structure, in which the high concentration regions 31d1 and 31s1 are spaced apart from the ends of the gate electrode 33a. In this case, the regions in which impurities have not been introduced between the high concentration regions 31d1 and 31s1 and the ends of the gate electrode 33a are the low concentration regions 31d2 and 31s2.

In the above-described embodiments, cases in which the capacitance element 55 is formed at the first substrate 10 of a liquid crystal device are illustrated as examples. However, the present disclosure may be applied to cases in which the capacitance element 55 is formed at a substrate of an organic electroluminescence device.

Installation Example to Electronic Apparatus

Figure 20:
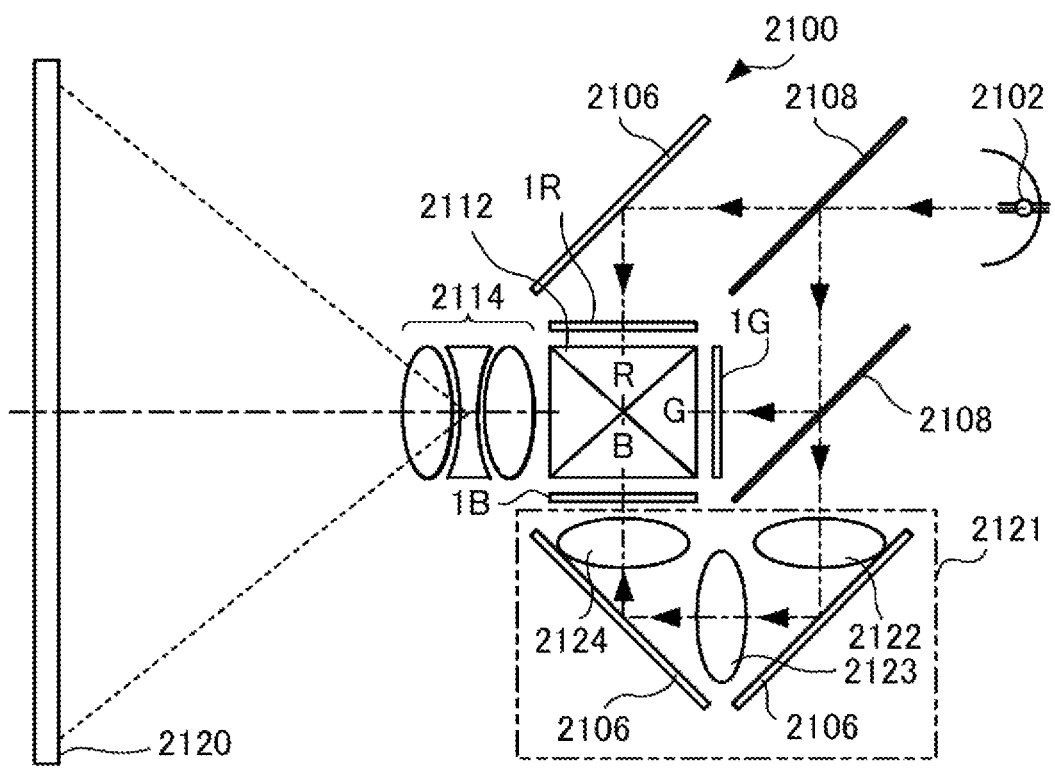
FIG. 20 is a schematic configuration diagram of a projection-type display device that uses an electro-optical device to which the present disclosure is applied.

An electronic apparatus that uses the electro-optical device 1 according to the above-described embodiments will be described. FIG. 20 is a schematic configuration diagram of a projection-type display device that uses the electro-optical device 1 to which the present disclosure is applied. In FIG. 20, illustration of an optical element such as a polarizing plate is omitted. A projection-type display device 2100 illustrated in FIG. 20 is an example of an electronic apparatus that uses the electro-optical device 1.

In the projection-type display device 2100 illustrated in FIG. 20, the electro-optical device 1 is used as light valves, and a high-definition, bright display is made possible without increasing the size of the device. As illustrated in FIG. 20, a lamp unit 2102 (light source unit) including a white light source such as a halogen lamp is provided inside the projection-type display device 2100. Projection light emitted from the lamp unit 2102 is split into three primary colors of red (R) color, green (G) color, and blue (B) color by three mirrors 2106 and two dichroic mirrors 2108 disposed inside. The split projection light is each guided to a light valve 1R, 1G, or 1B corresponding to each of the primary colors, and modulated. Note that since it has a longer optical path as compared to the other light of the R color and the G color, the light of the B color is guided via a relay lens system 2121 including an incidence lens 2122, a relay lens 2123, and an emission lens 2124 to prevent the loss of the light of the B color.

The light modulated by the light valves 1R, 1G, and 1B is incident on a dichroic prism 2112 from three directions. Then, at the dichroic prism 2112, the light of the R color and the light of the B color are reflected at 90 degrees, while the light of the G color is transmitted. Accordingly, after images of the respective primary colors are synthesized, a color image is projected on a screen 2120 by a projection lens group 2114 (projection optical system).

Other Projection-Type Display Devices

Note that the projection-type display device may use an LED light source or the like that emits light of each color as a light source unit, and supply the light of each color emitted from such an LED light source to another liquid crystal device.

Other Electronic Apparatuses

Electronic apparatuses that include the electro-optical device 1 to which the present disclosure is applied are not limited to the projection-type display device 2100 of the above-described embodiment. For example, the electro-optical device 1 to which the present disclosure is applied may be used in electronic apparatuses such as a projection-type head-up display (HUD), a direct-view-type head-mounted display (HMD), a personal computer, a digital still camera, and a liquid crystal television.

What is claimed is:

1. An electro-optical device comprising:
a substrate body provided with a groove;
an insulating film layered on the substrate body in a region including the groove; and a layered film layered on the insulating film, wherein
the layered film is provided along a side surface and a bottom surface of the groove with the insulating film disposed therebetween,
an opening width of the groove is from 0.6 μm to 1.0 μm, and
a thickness of the insulating film is from 0.05 μm to 0.3 μm.

2. The electro-optical device according to claim 1, wherein
a depth of the groove is greater than a total film thickness of the insulating film and the layered film,
a width of a bottom surface of the layered film is narrower than a width of the bottom surface of the groove, and
the layered film is disposed along opening edges on both sides of the insulating film.

3. An electro-optical device comprising:
a substrate body provided with a groove;
an insulating film layered on the substrate body in a region including the groove; and
a layered film layered on the insulating film, wherein
the layered film is provided along a side surface and a bottom surface of the groove with the insulating film disposed therebetween, and
the insulating film includes a protrusion protruding from an opening edge of the groove toward an inner side of the groove.

4. The electro-optical device according to claim 1, wherein
the layered film includes a first conductive film, a dielectric film, and a second conductive film sequentially layered on the insulating film,
the first conductive film overlaps the side surface and the bottom surface of the groove with the insulating film disposed therebetween,
the dielectric film overlaps the side surface and the bottom surface with the first conductive film and the insulating film disposed therebetween, and
the second conductive film overlaps the side surface and the bottom surface with the dielectric film, the first conductive film, and the insulating film disposed therebetween.

5. The electro-optical device according to claim 4, comprising:
a pixel electrode;
a scanning line between the substrate body and the pixel electrode;
a data line intersecting the scanning line between the substrate body and the pixel electrode;
a transistor provided corresponding to an intersection between the scanning line and the data line, and including a semiconductor film; and
a capacitance element including the layered film; wherein
the groove includes a first groove extending so as to overlap one of the scanning line and the data line in plan view, and a second groove extending so as to overlap the other of the scanning line and the data line in plan view.

6. The electro-optical device according to claim 5, wherein the first groove and the second groove are provided away from each other.

7. The electro-optical device according to claim 5, wherein the capacitance element is provided between the substrate body and the semiconductor film.

8. The electro-optical device according to claim 1, wherein the groove is provided in the substrate body.

9. An electronic apparatus comprising the electro-optical device according to claim 1.

* * * * *